United States Patent [19]

Saga et al.

[11] Patent Number: 5,790,482
[45] Date of Patent: Aug. 4, 1998

[54] OPTICAL DISK APPARATUS FOR RECORDING INFORMATION USING A LIGHT INTENSITY MODULATION METHOD WITH A PARTIAL RESPONSE DETECTOR

[75] Inventors: Hideki Saga, Kokubunji; Hiroyuki Tsuchinaga, Odawara; Hirofumi Sukeda, Tokorozawa, all of Japan

[73] Assignee: Hitachi, Ltd., Tokyo, Japan

[21] Appl. No.: 503,626

[22] Filed: Jul. 18, 1995

[30] Foreign Application Priority Data

Jul. 20, 1994 [JP] Japan ................................. 6-167669

[51] Int. Cl.[6] .......................... G11B 7/00; G11B 11/00
[52] U.S. Cl. ................................ 369/13; 369/48; 369/58
[58] Field of Search .............................. 369/13, 48, 54, 369/58, 124, 44.35, 44.26, 44.27, 47, 116, 59, 32

[56] References Cited

U.S. PATENT DOCUMENTS 5,361,247  11/1994  Fuji et al. ............................... 369/48
5,559,777   9/1996  Maeda et al. ........................... 369/50

FOREIGN PATENT DOCUMENTS 2-183471   7/1990  Japan .
2-236823   9/1990  Japan .
5-225706   9/1993  Japan .
5-298737  11/1993  Japan .

OTHER PUBLICATIONS

E.R. Kretzmer, "Generalization of a Technique for Binary Data Communication", IEEE Transactions on Communication Technology, COM-14, No. 67, Feb. 1966.

"Signal Processing Scheme PRML, Supporting Next-Generation Large-Capacity 6-Stage Device", Part 4, Nikkei Electronics, Jan. 17, 1994, Issue No. 559, pp. 71-97.

Primary Examiner—Ali Neyzari
Attorney, Agent, or Firm—Fay, Sharpe, Beall, Fagan, Minnich & McKee

[57] ABSTRACT

An optical disk apparatus is capable of recording, reproduction and erasure by a laser beam. The user data is recorded in a RAM area on an optical disk by a recording device including a modulation encoder and a recording waveform generator. At the time of reproduction, the data in the RAM/ROM area is detected by a reproduction device to thereby demodulate the user data.

8 Claims, 27 Drawing Sheets

RECORDING CODE STRING 205

TIME

AUXILIARY RECORDING PULSE A 401

TIME

AUXILIARY RECORDING PULSE B 402

TIME

LEADING RECORDING PULSE 403

TIME

SUCCEEDING RECORDING PULSE 404

TIME

PREHEATING PORTION
NO-MARK-FORMING PORTION
MARK-FORMING PORTION
LIGHT EMISSION POWER LEVEL
RECORDING LIGHT PULSE TRAIN 405
Pb  Pas1  Pw1  Pw2  Pas2  RESTING PORTION
TIME

RECORDING MARK 406

CHANNEL MARK

DISTANCE

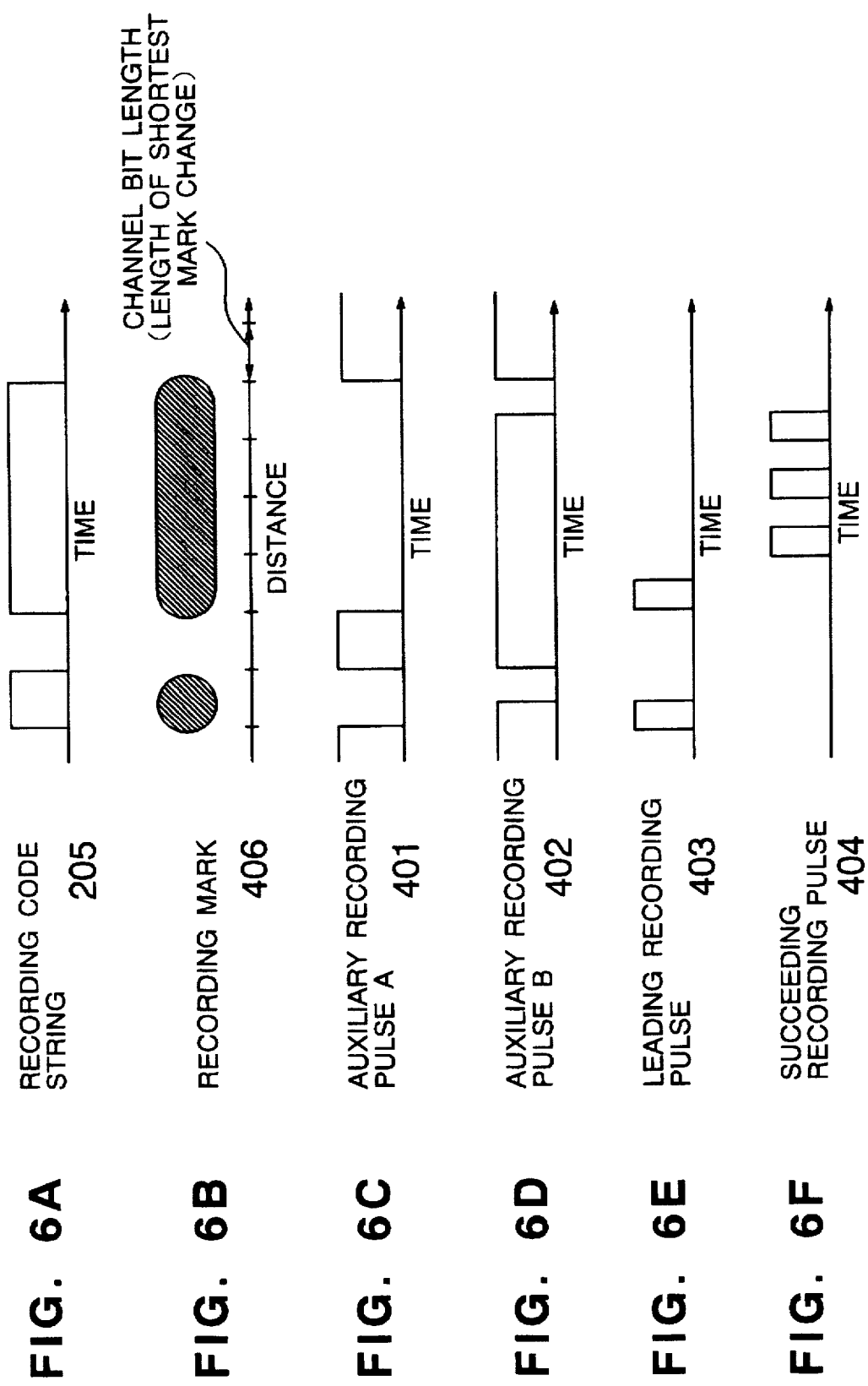

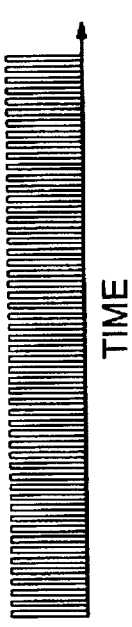
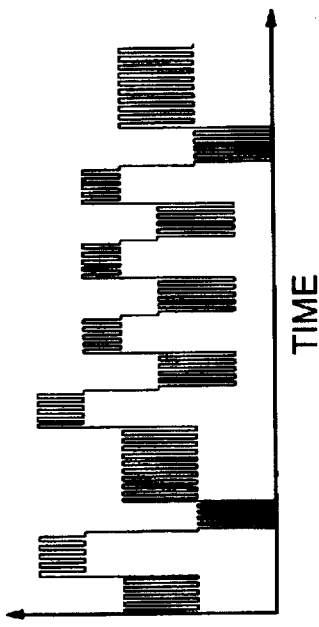
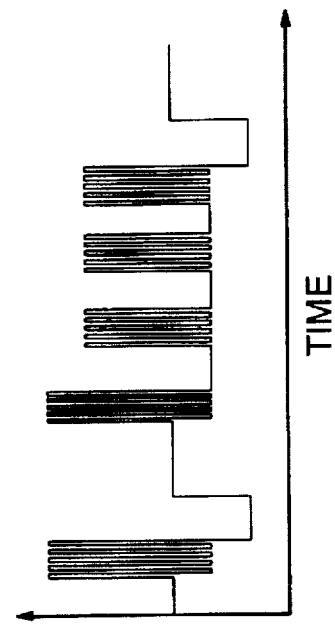
FIG. 6G  HIGH-FREQUENCY SUPERPOSITION PULSE 601
FIG. 6H  LASER DRIVE CURRENT WAVEFORM 1  602
FIG. 6I  LASER DRIVE CURRENT WAVEFORM 2  603

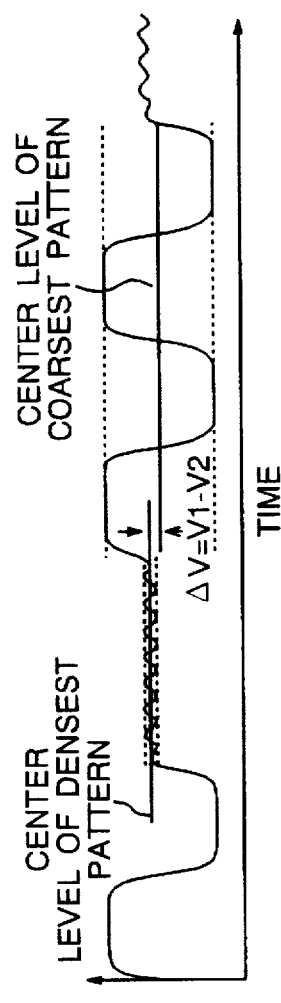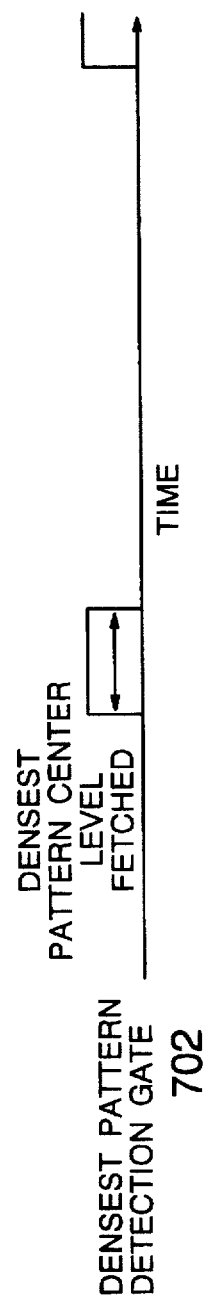
FIG. 7A
FIG. 7B
FIG. 7C

FIG. 11

| RESTRAINT (2) | | RESTRAINT (1) | RESTRAINT (3) | | NUMBER OF CODES SATISFYING THE RESTRAINTS |
|---|---|---|---|---|---|
| CDS | NUMBER OF CODES | | LIMITATION OF "0" RUN NUMBER | LIMITATION OF "1" RUN NUMBER | |
| 9 | 1 | 0 | NOT SHOWN | NOT SHOWN | 0 |
| 8 | 4 | 0 | | | 0 |
| 7 | 9 | 0 | | | 0 |
| 6 | 14 | 0 | | | 0 |
| 5 | 36 | 9 | | | 0 |
| 4 | 56 | 22 | | | 0 |
| 3 | 84 | 54 | 4 | 4 | (54) |
| 2 | 112 | 86 | 2 | 10 | 78 |
| 1 | 126 | 117 | 0 | 10 | 105 |
| 0 | 70 | 65 | | | 55 |
| TOTAL | 256 | | | | TOTAL : 292 |

FIG. 12

| DATA BIT (decimal) | CHANNEL (binary) | DATA BIT (decimal) | CHANNEL (binary) | DATA BIT (decimal) | CHANNEL (binary) | DATA BIT (decimal) | CHANNEL (binary) |
|---|---|---|---|---|---|---|---|
| 0 | 0 0 0 1 0 0 0 0 1 | 65 | 0 1 0 0 1 1 0 1 0 | 130 | 1 0 0 0 0 1 0 0 1 | 195 | 1 0 1 1 1 0 1 0 0 |
| 1 | 0 0 0 1 0 0 0 1 0 | 66 | 0 1 0 0 1 1 0 1 1 | 131 | 1 0 0 0 1 0 0 0 1 | 196 | 1 0 1 1 1 0 1 0 1 |
| 2 | 0 0 0 1 0 0 0 1 1 | 67 | 0 1 0 0 1 1 1 0 0 | 132 | 1 0 0 0 1 0 0 1 0 | 197 | 1 0 1 1 1 0 1 1 0 |
| 3 | 0 0 0 1 0 0 1 0 1 | 68 | 0 1 0 0 1 1 1 0 1 | 133 | 1 0 0 0 1 0 0 1 1 | 198 | 1 0 1 1 1 0 1 1 1 |
| 4 | 0 0 0 1 0 0 1 1 0 | 69 | 0 1 0 0 1 1 1 1 0 | 134 | 1 0 0 0 1 0 1 0 1 | 199 | 1 0 1 1 1 1 0 1 0 |
| 5 | 0 0 0 1 0 0 1 1 1 | 70 | 0 1 0 1 0 0 0 1 0 | 135 | 1 0 0 0 1 0 1 1 0 | 200 | 1 0 1 1 1 1 1 0 0 |
| 6 | 0 0 0 1 0 1 0 1 0 | 71 | 0 1 0 1 0 0 0 1 1 | 136 | 1 0 0 0 1 0 1 1 1 | 201 | 1 0 1 1 1 1 1 0 1 |
| 7 | 0 0 0 1 0 1 0 1 1 | 72 | 0 1 0 1 0 0 1 0 0 | 137 | 1 0 0 0 1 1 1 0 0 | 202 | 1 1 0 0 0 0 1 0 0 |
| 8 | 0 0 0 1 0 1 1 0 0 | 73 | 0 1 0 1 0 0 1 0 1 | 138 | 1 0 0 0 1 1 1 0 1 | 203 | 1 1 0 0 0 1 0 0 0 |
| 9 | 0 0 0 1 0 1 1 0 1 | 74 | 0 1 0 1 0 0 1 1 0 | 139 | 1 0 0 1 0 0 0 0 1 | 204 | 1 1 0 0 0 1 0 0 1 |
| 10 | 0 0 0 1 1 0 1 0 0 | 75 | 0 1 0 1 0 0 1 1 1 | 140 | 1 0 0 1 0 0 0 1 0 | 205 | 1 1 0 0 0 1 0 1 0 |
| 11 | 0 0 0 1 1 1 0 0 1 | 76 | 0 1 0 1 0 1 0 0 0 | 141 | 1 0 0 1 0 0 0 1 1 | 206 | 1 1 0 0 0 1 0 1 1 |
| 12 | 0 0 0 1 1 1 0 1 1 | 77 | 0 1 0 1 0 1 0 0 1 | 142 | 1 0 0 1 0 0 1 0 0 | 207 | 1 1 0 0 0 1 1 1 0 |
| 13 | 0 0 1 0 0 0 0 1 0 | 78 | 0 1 0 1 0 1 0 1 0 | 143 | 1 0 0 1 0 0 1 0 1 | 208 | 1 1 0 0 1 0 0 0 1 |
| 14 | 0 0 1 0 0 0 0 1 1 | 79 | 0 1 0 1 0 1 0 1 1 | 144 | 1 0 0 1 0 0 1 1 0 | 209 | 1 1 0 0 1 0 0 1 0 |
| 15 | 0 0 1 0 0 0 1 0 0 | 80 | 0 1 0 1 0 1 1 0 0 | 145 | 1 0 0 1 0 0 1 1 1 | 210 | 1 1 0 0 1 0 0 1 1 |
| 16 | 0 0 1 0 0 0 1 0 1 | 81 | 0 1 0 1 0 1 1 0 1 | 146 | 1 0 0 1 0 1 0 0 1 | 211 | 1 1 0 0 1 0 1 0 0 |
| 17 | 0 0 1 0 0 0 1 1 0 | 82 | 0 1 0 1 0 1 1 1 0 | 147 | 1 0 0 1 0 1 0 1 0 | 212 | 1 1 0 0 1 0 1 0 1 |
| 18 | 0 0 1 0 0 0 1 1 1 | 83 | 0 1 0 1 1 0 0 1 0 | 148 | 1 0 0 1 0 1 0 1 1 | 213 | 1 1 0 0 1 0 1 1 0 |
| 19 | 0 0 1 0 0 1 0 0 1 | 84 | 0 1 0 1 1 0 0 1 1 | 149 | 1 0 0 1 0 1 1 0 0 | 214 | 1 1 0 0 1 0 1 1 1 |
| 20 | 0 0 1 0 0 1 0 1 0 | 85 | 0 1 0 1 1 0 1 0 0 | 150 | 1 0 0 1 0 1 1 0 1 | 215 | 1 1 0 0 1 1 0 1 0 |
| 21 | 0 0 1 0 0 1 0 1 1 | 86 | 0 1 0 1 1 0 1 0 1 | 151 | 1 0 0 1 0 1 1 1 0 | 216 | 1 1 0 0 1 1 1 0 0 |
| 22 | 0 0 1 0 0 1 1 0 0 | 87 | 0 1 0 1 1 0 1 1 0 | 152 | 1 0 0 1 1 0 1 0 0 | 217 | 1 1 0 0 1 1 1 0 1 |
| 23 | 0 0 1 0 0 1 1 0 1 | 88 | 0 1 0 1 1 0 1 1 1 | 153 | 1 0 0 1 1 0 1 0 1 | 218 | 1 1 0 1 0 0 0 1 0 |
| 24 | 0 0 1 0 0 1 1 1 0 | 89 | 0 1 0 1 1 1 0 0 1 | 154 | 1 0 0 1 1 1 0 0 0 | 219 | 1 1 0 1 0 0 0 1 1 |
| 25 | 0 0 1 0 1 0 0 1 0 | 90 | 0 1 0 1 1 1 0 1 0 | 155 | 1 0 0 1 1 1 0 0 1 | 220 | 1 1 0 1 0 0 1 0 0 |
| 26 | 0 0 1 0 1 0 0 1 1 | 91 | 0 1 0 1 1 1 0 1 1 | 156 | 1 0 0 1 1 1 0 1 0 | 221 | 1 1 0 1 0 0 1 0 1 |
| 27 | 0 0 1 0 1 0 1 0 0 | 92 | 0 1 0 1 1 1 1 0 0 | 157 | 1 0 0 1 1 1 0 1 1 | 222 | 1 1 0 1 0 0 1 1 0 |
| 28 | 0 0 1 0 1 0 1 0 1 | 93 | 0 1 0 1 1 1 1 0 1 | 158 | 1 0 0 1 1 1 1 1 0 | 223 | 1 1 0 1 0 0 1 1 1 |
| 29 | 0 0 1 0 1 0 1 1 0 | 94 | 0 1 0 1 1 1 1 1 0 | 159 | 1 0 1 0 0 0 0 1 0 | 224 | 1 1 0 1 0 1 0 0 0 |
| 30 | 0 0 1 0 1 0 1 1 1 | 95 | 0 1 1 0 0 0 1 0 0 | 160 | 1 0 1 0 0 0 1 0 0 | 225 | 1 1 0 1 0 1 0 0 1 |
| 31 | 0 0 1 0 1 1 0 0 0 | 96 | 0 1 1 0 0 0 1 0 1 | 161 | 1 0 1 0 0 0 1 0 1 | 226 | 1 1 0 1 0 1 0 1 0 |
| 32 | 0 0 1 0 1 1 0 0 1 | 97 | 0 1 1 0 0 1 0 0 0 | 162 | 1 0 1 0 0 0 1 1 0 | 227 | 1 1 0 1 0 1 0 1 1 |
| 33 | 0 0 1 0 1 1 0 1 0 | 98 | 0 1 1 0 0 1 0 0 1 | 163 | 1 0 1 0 0 0 1 1 1 | 228 | 1 1 0 1 0 1 1 0 0 |
| 34 | 0 0 1 0 1 1 0 1 1 | 99 | 0 1 1 0 0 1 0 1 0 | 164 | 1 0 1 0 0 1 0 0 0 | 229 | 1 1 0 1 0 1 1 0 1 |
| 35 | 0 0 1 0 1 1 1 0 1 | 100 | 0 1 1 0 0 1 0 1 1 | 165 | 1 0 1 0 0 1 0 0 1 | 230 | 1 1 0 1 0 1 1 1 0 |
| 36 | 0 0 1 0 1 1 1 1 0 | 101 | 0 1 1 0 0 1 1 1 0 | 166 | 1 0 1 0 0 1 0 1 0 | 231 | 1 1 0 1 1 0 0 1 0 |
| 37 | 0 0 1 1 0 0 1 0 0 | 102 | 0 1 1 0 1 0 0 0 1 | 167 | 1 0 1 0 0 1 0 1 1 | 232 | 1 1 0 1 1 0 1 0 0 |
| 38 | 0 0 1 1 0 0 1 0 1 | 103 | 0 1 1 0 1 0 0 1 0 | 168 | 1 0 1 0 0 1 1 0 0 | 233 | 1 1 0 1 1 0 1 0 1 |
| 39 | 0 0 1 1 0 1 0 0 0 | 104 | 0 1 1 0 1 0 0 1 1 | 169 | 1 0 1 0 0 1 1 0 1 | 234 | 1 1 0 1 1 1 0 0 0 |
| 40 | 0 0 1 1 0 1 0 0 1 | 105 | 0 1 1 0 1 0 1 0 1 | 170 | 1 0 1 0 0 1 1 1 0 | 235 | 1 1 0 1 1 1 0 0 1 |
| 41 | 0 0 1 1 0 1 0 1 1 | 106 | 0 1 1 0 1 0 1 1 0 | 171 | 1 0 1 0 1 0 0 0 1 | 236 | 1 1 0 1 1 1 0 1 0 |
| 42 | 0 0 1 1 0 1 1 1 0 | 107 | 0 1 1 0 1 0 1 1 1 | 172 | 1 0 1 0 1 0 0 1 0 | 237 | 1 1 0 1 1 1 0 1 1 |
| 43 | 0 0 1 1 1 0 0 0 1 | 108 | 0 1 1 0 1 1 0 1 0 | 173 | 1 0 1 0 1 0 0 1 1 | 238 | 1 1 0 1 1 1 1 1 0 |
| 44 | 0 0 1 1 1 0 0 1 0 | 109 | 0 1 1 0 1 1 1 0 0 | 174 | 1 0 1 0 1 0 1 0 0 | 239 | 1 1 1 0 0 0 1 0 0 |
| 45 | 0 0 1 1 1 0 1 0 1 | 110 | 0 1 1 0 1 1 1 0 1 | 175 | 1 0 1 0 1 0 1 0 1 | 240 | 1 1 1 0 0 0 1 0 1 |
| 46 | 0 0 1 1 1 0 1 0 1 | 111 | 0 1 1 1 0 0 0 1 0 | 176 | 1 0 1 0 1 0 1 1 0 | 241 | 1 1 1 0 0 1 0 0 0 |
| 47 | 0 0 1 1 1 0 1 1 0 | 112 | 0 1 1 1 0 0 0 1 1 | 177 | 1 0 1 0 1 0 1 1 1 | 242 | 1 1 1 0 0 1 0 0 1 |
| 48 | 0 0 1 1 1 0 1 1 1 | 113 | 0 1 1 1 0 0 1 0 0 | 178 | 1 0 1 0 1 1 0 0 0 | 243 | 1 1 1 0 0 1 0 1 0 |
| 49 | 0 0 1 1 1 1 0 1 0 | 114 | 0 1 1 1 0 0 1 0 1 | 179 | 1 0 1 0 1 1 0 0 1 | 244 | 1 1 1 0 0 1 0 1 1 |
| 50 | 0 0 1 1 1 1 1 0 1 | 115 | 0 1 1 1 0 0 1 1 0 | 180 | 1 0 1 0 1 1 0 1 0 | 245 | 1 1 1 0 0 1 1 1 0 |
| 51 | 0 1 0 0 0 0 1 0 0 | 116 | 0 1 1 1 0 0 1 1 1 | 181 | 1 0 1 0 1 1 0 1 1 | 246 | 1 1 1 0 1 0 0 0 1 |
| 52 | 0 1 0 0 0 0 1 0 1 | 117 | 0 1 1 1 0 1 0 0 1 | 182 | 1 0 1 0 1 1 1 0 0 | 247 | 1 1 1 0 1 0 0 1 0 |
| 53 | 0 1 0 0 0 1 0 0 0 | 118 | 0 1 1 1 0 1 0 1 0 | 183 | 1 0 1 0 1 1 1 0 1 | 248 | 1 1 1 0 1 0 0 1 1 |
| 54 | 0 1 0 0 0 1 0 0 1 | 119 | 0 1 1 1 0 1 0 1 1 | 184 | 1 0 1 0 1 1 1 1 0 | 249 | 1 1 1 0 1 0 1 0 0 |
| 55 | 0 1 0 0 0 1 0 1 0 | 120 | 0 1 1 1 0 1 1 0 0 | 185 | 1 0 1 1 0 0 1 0 0 | 250 | 1 1 1 0 1 0 1 0 1 |
| 56 | 0 1 0 0 0 1 0 1 1 | 121 | 0 1 1 1 0 1 1 0 1 | 186 | 1 0 1 1 0 0 1 0 1 | 251 | 1 1 1 0 1 0 1 1 0 |
| 57 | 0 1 0 0 0 1 1 1 0 | 122 | 0 1 1 1 0 1 1 1 0 | 187 | 1 0 1 1 0 1 0 0 0 | 252 | 1 1 1 0 1 0 1 1 1 |
| 58 | 0 1 0 0 1 0 0 0 1 | 123 | 0 1 1 1 1 0 0 1 0 | 188 | 1 0 1 1 0 1 0 0 1 | 253 | 1 1 1 0 1 1 0 1 0 |
| 59 | 0 1 0 0 1 0 0 1 0 | 124 | 0 1 1 1 1 0 1 0 0 | 189 | 1 0 1 1 0 1 0 1 0 | 254 | 1 1 1 0 1 1 1 0 0 |
| 60 | 0 1 0 0 1 0 0 1 1 | 125 | 0 1 1 1 1 0 1 0 1 | 190 | 1 0 1 1 0 1 0 1 1 | 255 | 1 1 1 0 1 1 1 0 1 |
| 61 | 0 1 0 0 1 0 1 0 0 | 126 | 0 1 1 1 1 1 0 0 1 | 191 | 1 0 1 1 0 1 1 1 0 | | |
| 62 | 0 1 0 0 1 0 1 0 1 | 127 | 0 1 1 1 1 1 0 1 0 | 192 | 1 0 1 1 1 0 0 0 1 | | |
| 63 | 0 1 0 0 1 0 1 1 0 | 128 | 0 1 1 1 1 1 0 1 1 | 193 | 1 0 1 1 1 0 0 1 0 | | |
| 64 | 0 1 0 0 1 0 1 1 1 | 129 | 1 0 0 0 0 1 0 0 0 | 194 | 1 0 1 1 1 0 0 1 1 | | |

FIG. 16

| BYTE | 1 | 2 | 3 | 4 | 5 | 6 | 7 | 8 |
|---|---|---|---|---|---|---|---|---|
| CODE | 000100011 | 101000100 | 001001010 | 001010100 | 000100110 | 001101000 | 001001010 | 010010010 |

| BYTE | 9 | 10 | 11 | 12 | 13 | 14 | 15 | 16 |
|---|---|---|---|---|---|---|---|---|
| CODE | 000100011 | 100100010 | 001001010 | 010100100 | 000100110 | 011001000 | 001010100 | 001001010 |

| BYTE | 17 | 18 | 19 | 20 | 21 | 22 | 23 | 24 |
|---|---|---|---|---|---|---|---|---|
| CODE | 000100011 | 110001000 | 001010100 | 010010010 | 000101100 | 001101000 | 001010100 | 010100100 |

| BYTE | 25 | 26 | 27 | 28 | 29 | 30 | 31 | 32 |
|---|---|---|---|---|---|---|---|---|
| CODE | 001000101 | 101000100 | 010010010 | 001001010 | 000101100 | 011001000 | 010010010 | 001010100 |

| BYTE | 33 | 34 | 35 | 36 | 37 | 38 | 39 | 40 |
|---|---|---|---|---|---|---|---|---|
| CODE | 001000101 | 100100010 | 010010010 | 010100100 | 001101000 | 000100110 | 010100100 | 001001010 |

| BYTE | 41 | 42 | 43 | 44 | 45 | 46 | 47 | 48 |
|---|---|---|---|---|---|---|---|---|
| CODE | 001000101 | 110001000 | 010100100 | 001010100 | 011001000 | 000100110 | 010100100 | 010010010 |

| BYTE | 49 | 50 | 51 | 52 | 53 | 54 | 55 | 56 |
|---|---|---|---|---|---|---|---|---|
| CODE | 010001001 | 101000100 | 000100011 | 000100011 | 001101000 | 000101100 | 001000101 | 001000101 |

| BYTE | 57 | 58 | 59 | 60 | 61 | 62 | 63 | 64 |
|---|---|---|---|---|---|---|---|---|
| CODE | 010001001 | 110001000 | 010001001 | 010001001 | 011001000 | 000101100 | 000100110 | 000100110 |

| BYTE | 65 | 66 | 67 | 68 | 69 | 70 | 71 | 72 |
|---|---|---|---|---|---|---|---|---|
| CODE | 010001001 | 100100010 | 000101100 | 000101100 | 001001010 | 001001010 | 001010100 | 001010100 |

↑ : FRONT EDGE
↓ : REAR EDGE

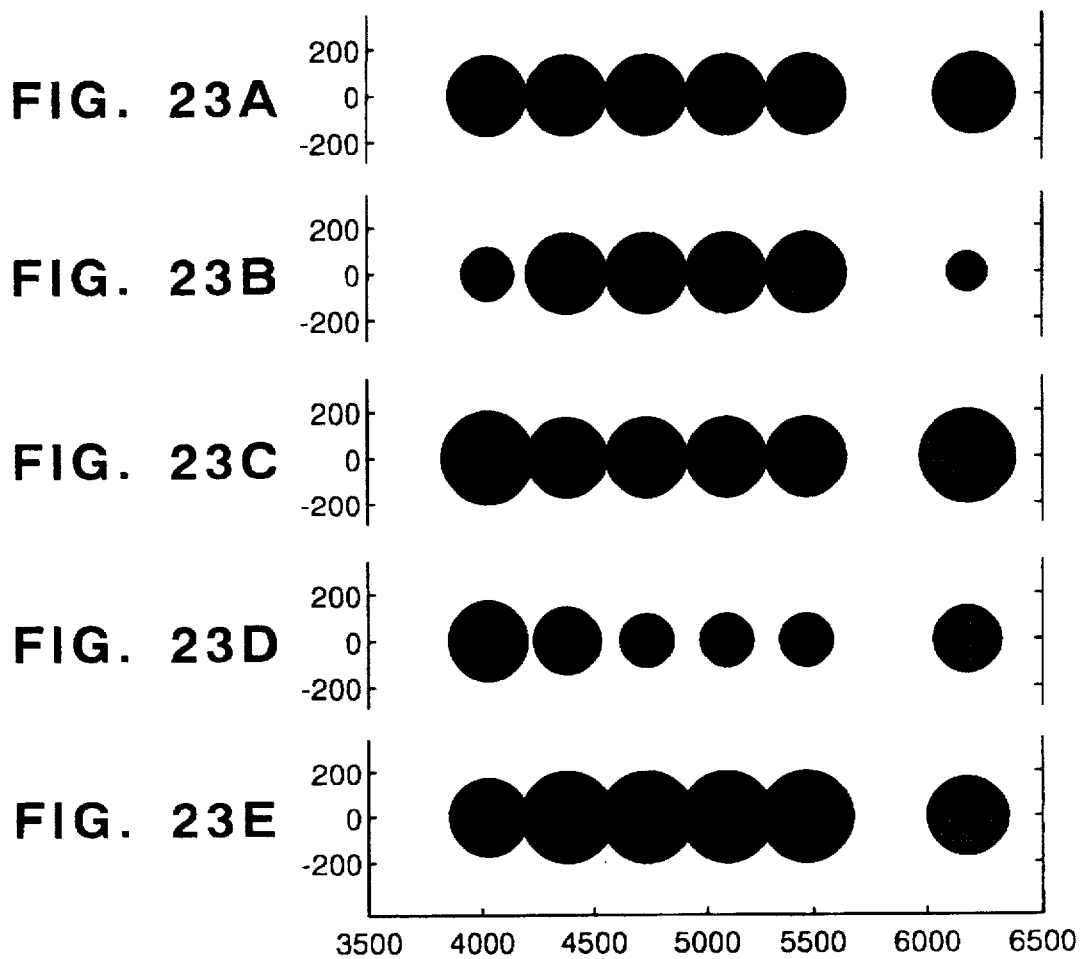
COORDINATE UNIT : nm (COMMON ABSCISSA)

OPTICAL DISK APPARATUS FOR RECORDING INFORMATION USING A LIGHT INTENSITY MODULATION METHOD WITH A PARTIAL RESPONSE DETECTOR

BACKGROUND OF THE INVENTION

The present invention relates to an information recording/reproduction apparatus for performing the recording/reproduction or reproduction on an optical recording medium, or more particularly to a method and an apparatus for realizing the high-density recording/reproduction or the high-density reproduction by application of a partial response class 1 (the partial response is hereinafter referred to as "PR") to the optical disk.

A recording/reproduction method using a mark of a size proximate to the cut-off frequency for optical frequency response has conventionally been suggested as a high-density technique for the optical disk. Conventional techniques corresponding to this technique involve the one for forming a high-accuracy recording mark on the recording side and the PR technique on the reproduction side. The reproduction side will be described first.

PR is such that information is transmitted while securing the detection margin of data by the positive use of the inter-code interference caused during the reproduction of information bits recorded in high density. PR is classified into various forms as described in E. R. Kretzmer, "Generalization of a Technique for Binary Data Transmission", IEEE Trans. Comm. Tech., Com-14, 67 (1966). Among them, PR(1,1) or PR(1,2,1) belonging to class 1 is often employed since the response characteristics thereof well suits the high-frequency cut-off characteristics of the optical disk channel.

First, as a first example of the prior art, an optical disk apparatus using PR(1,1) described in JP-A-5-225706 will be explained. In this apparatus, a clock signal is obtained from a preformatted clock-generating bit stream using an optical disk of sample servo format, and the recording operation is performed by modulation of a recording magnetic field while irradiating a laser beam with high output. Also, the apparatus is intended to detect data with the same clock at the time of reproduction.

As a second example of the prior art, JP-A-2-236823 and a feature article entitled "Signal Processing Scheme PRML, Supporting Next-Generation Large-Capacity Storage Device", Parts 1–4, "Nikkei Electronics", Jan. 17, 1994 issue, No. 599, pp.71–97 (NEC method) disclose an apparatus in which information is recorded by modulating a laser beam output in accordance with a transmission bit stream under the influence of a predetermined recording magnetic field and extracting a clock signal from the reproduction signal for data discrimination.

A third example of the prior art described in JP-A-5-298737 will be explained as a means for forming a high-accuracy recording mark required for high-density recording. According to this prior art, a recording code string for a recording mark is decomposed into a pulse train corresponding to the length of the code string, so that the number and amplitude of pulses in the pulse train are controlled in accordance with the length of the recording code string. This pulse train is divided into two parts including a leading section and a succeeding section with different pulse heights. At the same time, auxiliary recording pulses are generated in the gaps of the recording code string (rest periods other than the pulse section), with some gap section provided before and after the fall of the recording code string. As a result, the heat from the last fall position of the recording pulse train fails to substantially change the temperature at the leading rise position of the next recording pulse train, thereby enabling the recording mark width and the recording mark length to be controlled appropriately.

Next, a fourth example of the prior art described in JP-A-5-298737 will be explained as a means for solving the problem of variations in the recording medium sensitivity at the time of high-density recording. According to this example of the prior art, a trial write area is provided at a predetermined position on a recording medium, and a trial write pattern is actually recorded in the trial write area. By evaluating the reproduction signal from the particular area, the operation for optimization of the recording power level is accomplished. FIG. 7D shows an example configuration required for evaluation of the reproduction signal in the operation for optimizing the recording condition in this prior art apparatus. As shown in FIG. 7A, a combination of two alternate types of pattern including the shortest and longest recording mark/gap repetitive patterns determined from the recording modulation scheme is used as a trial write pattern. The use of the (1,7) modulation scheme as an encoding scheme leads to the shortest and longest recording mark/gap lengths of 2Tw and 8Tw, respectively, (where Tw designates the channel bit length, i.e., the the shortest variation length that is the detection window width of the recording mask). Assuming that the bit length of the recording code string is 0.56 microns, the shortest recording mark/gap length is 0.75 microns, and the longest recording mark/gap length is 3.0 microns. Assuming that the wavelength of the laser used is 780 mm and the lens NA is 0.55, then the amplitude of the reproduction signal from the repetitive pattern (hereinafter referred to as "the coarsest pattern") for the longest recording mark/gap (8Tw long each) is substantially determined only by the width of the recording mark and the signal rise/fall position corresponds to the edge position of the recording mark. The reproduction signal from the repetitive pattern (hereinafter referred to as "the densest pattern") for the shortest recording mark/gap (each 2Tw long) has the amplitude thereof reduced as compared with the densest pattern since the recording mark/gap length is equal to one half the spot diameter of the reproduction light. Also, the central level of the reproduction signal amplitude, subjected to the optical interference from the recording marks before and after that, is shifted toward the recording mark side. The amount of shift, which is affected by both the length and width of the recording mark, is larger, the larger the length or width of the recording mark. In view of this, the recording operation has so far been controlled to secure a substantially constant width of the recording mark regardless of the length thereof, and then the power level has been optimized in such a manner that the central level of amplitude determined by the recording mark/gap pattern (such as the coarsest pattern) sufficiently longer than the reproduction light spot diameter coincides with the central level of the reproduction signal for the densest pattern. In the configuration of FIG. 7D shown in the same patent publication, the central level of the reproduction signal amplitude from the densest/coarsest pattern is determined from the average value of the signal levels representing the upper and lower envelopes. The peak and bottom levels of the reproduction signal from the densest pattern are held in a peak hold circuit 704 and a bottom hold circuit 705 respectively, and the average level thereof is held in a sample hold circuit 707 with a densest pattern detection gate 702 as a trigger. In similar fashion, the average level of the reproduction signal from the coarsest pattern is held in a sample hold circuit 706 with a coarsest pattern detection gate 703 as a trigger. Assuming that the respective average values of the reproduction signals are V1 and V2, a reproduction signal evaluation signal 713 (ΔV signal: ΔV=V1-V2) is obtained by calculating V1-V2 through a differential amplifier circuit 708. The basic procedure of operation for optimizing the recording condition in a fourth example of the prior art is shown in the form of a flowchart in FIG. 8. This example assumes an optical disk as a recording medium and a densest/coarsest pattern as a trial write pattern. With the start of the operation for optimizing the recording condition, an area for trial write operation provided at a predetermined position on the recording medium is erased in preparation for the next write operation. As the process proceeds to the write operation, a predetermined trial write pattern is recorded under the recording condition different for each recording area (such as a sector) providing a unit of recording management on the recording medium. Upon completion of the recording operation, the reproduction signal for each section is evaluated, and a recording condition most similar to the optimal recording condition is determined. Further, in order to accommodate the difference in recording condition along radial direction, the aforementioned operation is performed for each appropriate radial position (such as on the inner periphery, middle periphery, outer periphery or the recording zone) on the medium thereby to complete the trial write operation.

SUMMARY OF THE INVENTION

A first object of the present invention is to provide a method for data discrimination by extracting the clock signal from the reproduction signal for PR class 1 applied to the optical disk, and also to realize the high-density reproduction with PR class 1 at high reliability considering the variations in reproduction signal due to the change in the shape of the recording mark, disk change or the characteristic variations with each optical head.

A second object of the invention is to realize an improved planar recording density by reducing the recording mark width and the track width.

A third object of the invention is to reduce the apparatus cost by reducing the performance requirements of a recording control circuit.

A fourth object of the invention is to realize a high-accuracy recording mark control by suppressing as far as possible the variations of the recording mark due to laser noises or the sensitivity variations of a recording medium for recording a such a minuscule mark that cannot be resolved by the reproduction light spot.

Another object of the invention is to improve the adaptability between a recording/reproduction apparatus and a recording medium and also to suppress the variations of recording sensitivity of a recording/reproduction apparatus.

Still another object of the invention is to improve the information transfer rate and the storage capacity as well as the reliability of a recording/reproduction apparatus.

In any of the conventional apparatuses described above, a large-capacity, high-speed optical disk apparatus cannot be constructed while securing a subordinate compatibility for small-scale apparatuses by solving all the problems of the above-described conventional apparatuses at the same time.

The first conventional apparatus described above, for example, fails to consider the means for extracting a clock signal for data discrimination from a reproduction signal of the optical disk channel having the PR(1,1) characteristic, nor does it take note of the method for forming a recording mark with high accuracy by the optical modulation recording scheme realized in the third conventional apparatus. Also, the use of an optical disk of a servo format having a guide groove is not taken into account.

Further, the second conventional apparatus described above performs the recording operation under the condition of linear speed of 20 m/s while rotating an optical disk 200 mm in diameter at the high rate of 3600 rpm. This prior art fails to consider the fact that a mark can be formed with comparative ease in thermal magnetic recording and that a recording mark can be formed with high accuracy at a low linear speed of about 10 m/s in an optical disk apparatus having a diameter as small as less than five inches. As a result, a minuscule mark essential to high density structure cannot be recorded at a low linear speed, thereby posing the problem of the difficulty of improving the recording capacity.

In the third conventional apparatus described above, in which the recording clock period used for converting the recording code string of a recording mark into pulses is less than ½ of the shortest recording mark/gap length, a recording control circuit is difficult to realize when the recording density and the information transfer rate are increased.

The fourth conventional apparatus described above, on the other hand, fails to take into consideration the variations in recording sensitivity due to local thickness variations of the recording medium. Since the recording mark thus cannot be controlled with high accuracy over the whole recording medium, the problem of a reduced recording capacity is posed.

The object of the present invention is to obviate the above-mentioned problems of the prior art.

According to a first aspect of the invention, there is provided an optical disk apparatus employing the 8/9 block modulation scheme. In this system, the reproduction signal waveform determined from the PR class 1 response characteristic is sliced at a plurality of levels for multi-valued level detection, and a conversion table is selected in such a manner that the edges of the resulting edge pulse appear in more than a predetermined number within a block after 8/9 block modulation. Also, a means is provided in which a PLL is prepared for each level to extract the clock signal and realize the data discrimination from the edge pulse. Further, when the response characteristic of PR class 1 is corrected for reproduction into the normal characteristic, a specific recording signal on a disk having the reproduction correction characteristic is read by trial. As a consequence, the characteristics variations with each optical head can be accommodated and the inter-disk compatibility can be secured.

According to a second aspect of the invention, there is provided an optical disk apparatus employing a recording control scheme in which the temperature distribution of a recording film at the time of forming a recording mark is made substantially constant before and after the recording mark by irradiating a plurality of minuscule pulses (impulses).

According to a third aspect of the invention, there is provided an optical disk apparatus, wherein a recording pulse train and an auxiliary recording pulse train corresponding to a trial write code string or a code string converted into the one of an apparatus are generated from an input data bit stream, and a laser beam source is driven to perform the recording operation. A plurality of light power levels are provided for the recording light pulse train. Further, the duty factor of the laser drive current waveform corresponding to the mark-formed portion is set to about 50%, and the length of the rest portion in the no-mark-formed portion to about one half of the amount of change in the length of the recording mark.

According to a fourth aspect of the invention, there is provided an optical disk apparatus, wherein a trial write operation is performed at a predetermined position of a recording medium in advance, the light output of the same pulse is adjusted according to the quality of the reproduction signal obtained by the trial write operation, and after confirming the adaptability between the recording medium and the recording apparatus, normal information recording is started. Further, in order to accurately discriminate the condition of recording by trial write, the acceptability of the recording condition is determined before improving the amplitude or the frequency characteristic of the reproduction signal. Also, a high-frequency current is superposed on the laser drive current to suppress the laser noise as far as possible at the time of recording.

According to another aspect of the invention, there is provided an optical disk apparatus comprising a recording medium capable of overwriting information, wherein the light intensity of a recording pulse train and auxiliary recording pulses is modulated, and a plurality of the above-mentioned optical power levels are applied to the recording power and the erase power.

According to still another aspect of the invention, there is provided an optical disk apparatus, wherein the reproduction is performed immediately after recording an input data bit stream of normal information, and the input data bit stream is compared with an output data bit stream, or a recording code string with a detection code string.

In the case where the 8/9 block conversion table described above is used, more than a predetermined number of edges of the reproduction signal waveform sliced at a plurality of levels for multi-valued level detection appear within a block after the 8/9 block modulation. It is thus possible to extract the clock signal by providing a PLL for each level. Application of the well-known technique disclosed in JP-A-2-183471 leads to the possibility of producing an edge pulse having a reproduction signal waveform at the above-mentioned levels. An improved application of the well-known data discrimination method based on the PR class 1 level detection to the method of data discrimination based on an edge pulse makes it possible to reproduce channel bits recorded in high density. The channel bits are inversely converted into eight bits of the user data for each nine bits in correspondence with the 8/9 block conversion table. Further, the reproduction signal characteristic is corrected into the response characteristic of PR class 1 by trial reading a specific recording signal provided on the optical disk. Consequently, the characteristic variations with optical heads can be accommodated thereby to facilitate the securing of compatibility between different disks.

In the recording control scheme for forming a single mark by irradiating a plurality of minuscule pulses, the temperature of the recording film can be kept substantially constant and therefore the thermal crosstalks can be suppressed. Also, since the mark can be controlled substantially at a constant width regardless of the length of the recording mark, the intervals between the recording marks on adjacent tracks are substantially kept constant, so that the reproduction crosstalks can be suppressed below a predetermined level. A combination of this scheme and the operation for optimizing the recording condition can form minuscule marks with high accuracy even under variations of the environmental temperature or the recording sensitivity of the recording medium. The planar recording density can thus be improved by reducing the track width. Further, a high-frequency current is superposed on the laser drive current at the time of recording to minimize the laser noise and thereby to relax the effect of variations of the recording mark style attributable to the variations in the recording laser beam output that cannot be fully suppressed merely by the above-mentioned recording control scheme and the trial write operation. Especially, a considerable advantage is obtained when a minuscule mark is formed using an area proximate to a peak of the output distribution of the laser beam involved. Thus, the noise which otherwise is caused in low frequencies by uneven recording mark styles and the resulting signal level variations is reduced, thereby suppressing the reduction in detection margin due to the deterioration of S/N ratio.

In the above-mentioned trial write operation, a predetermined trial write pattern is written in a predetermined area of the recording medium prior to the normal information recording in order to detect the variations in recording sensitivity caused by the thickness variations of the recording medium resulting from the replacement of the recording medium, local variations of the recording medium thickness, variations in environmental temperature or different characteristics of recording apparatuses. Next, the quality of the reproduction signal from this area is evaluated, and the recording condition including the light power level of the recording waveform is changed in such a manner as to secure the adaptability between the recording medium and the recording apparatus. The aforementioned operation can always secure an optimum recording condition for a given recording medium. The erroneous information recording operation which otherwise might be caused by the variations in recording sensitivity is eliminated and a highly reliable recording/reproduction is made possible. Also, the reliability of recording and reproduction is improved by reproducing information from a recording portion immediately after recording the information at the same recording portion and performing the above-mentioned trial write operation either in the case here an input data bit stream is compared and fails to coincide with an output data bit stream or at predetermined regular intervals.

According to the present invention, the variations in recording sensitivity with a recording medium due to the variations in the thickness of the recording medium or the variations in environmental temperature and the variations in recording sensitivity with different recording/reproduction apparatuses can be suppressed, and the adaptability between a recording/reproduction apparatus and a recording medium can be improved while at the same time controlling the recording mark with high accuracy. Further, a high-density reproduction is realized by application of the PR scheme, thereby improving the reliability and storage capacity of the recording/reproduction apparatus and the information transfer rate.

As a result of applying the invention to an optical disk apparatus having a diameter of 90 mm (3.5 inches), the transfer rate of the user data was improved to more than 2 MB per second and the storage capacity to more than 600 MB. An optical disk apparatus of partial ROM type thus is provided having a ROM area on the same disk surface with a capacity comparable to the CD-ROM.

BRIEF DESCRIPTION OF THE DRAWINGS

FIGS. 6A to 6I show waveforms representing an example of high-frequency wave superposition according to the invention.

FIGS. 7A to 7C are diagrams for explaining the operation of evaluating a reproduction signal.

FIG. 11 is a diagram showing a table for explaining the sequence of selection of the 8/9 modulation code.

FIG. 12 is a diagram showing an example of the conversion table for 8/9 modulation.

FIG. 16 is a diagram showing an example evaluation pattern according to the 8/9 PR scheme.

FIGS. 23A to 23E are diagrams for explaining the variations in recording mark style according to the recording condition.

DESCRIPTION OF THE PREFERRED EMBODIMENTS

Embodiments of the present invention will be described.

Figure 1:
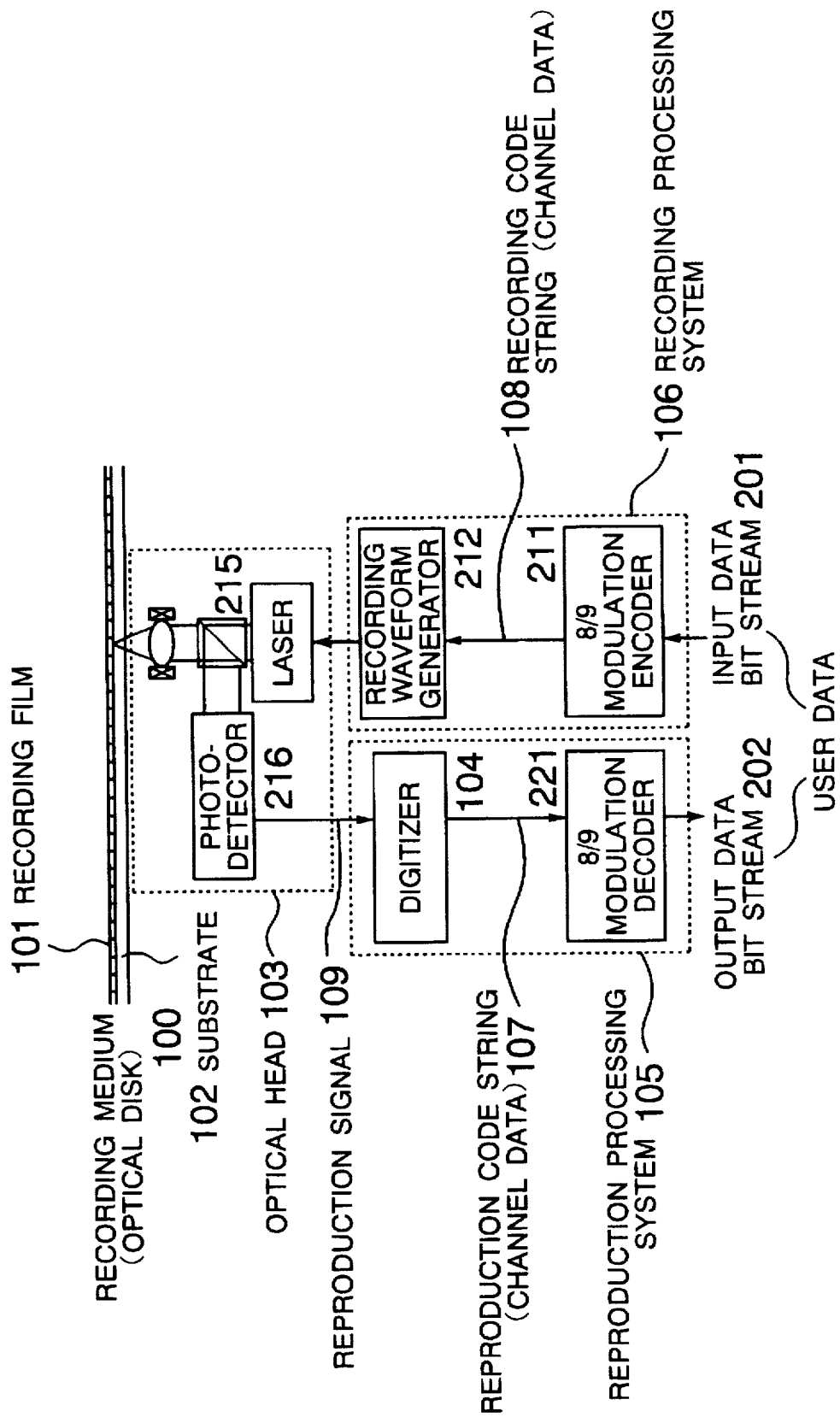
FIG. 1 is a block diagram showing an example configuration of an apparatus according to the present invention.

FIG. 1 shows an example configuration of an apparatus according to the present invention. An information recording/reproduction apparatus comprises a recording medium (optical disk) 100 for storing information, an optical head 103 for realizing the recording/reproduction operation, a recording processing system 106 for recording information by driving the optical head 103 in accordance with an input data bit stream 201, and a reproduction processing system 105 for converting a reproduction signal 109 obtained from the optical head into an output data bit stream 202. The recording medium 100 includes a recording film 101 and a substrate 102 for holding the recording film 101. The form of the recording medium 100 will be described taking a disk as an example. The recording medium 100 is not confined to the disk form but exactly the same configuration is possible with tape or card.

Figure 2:
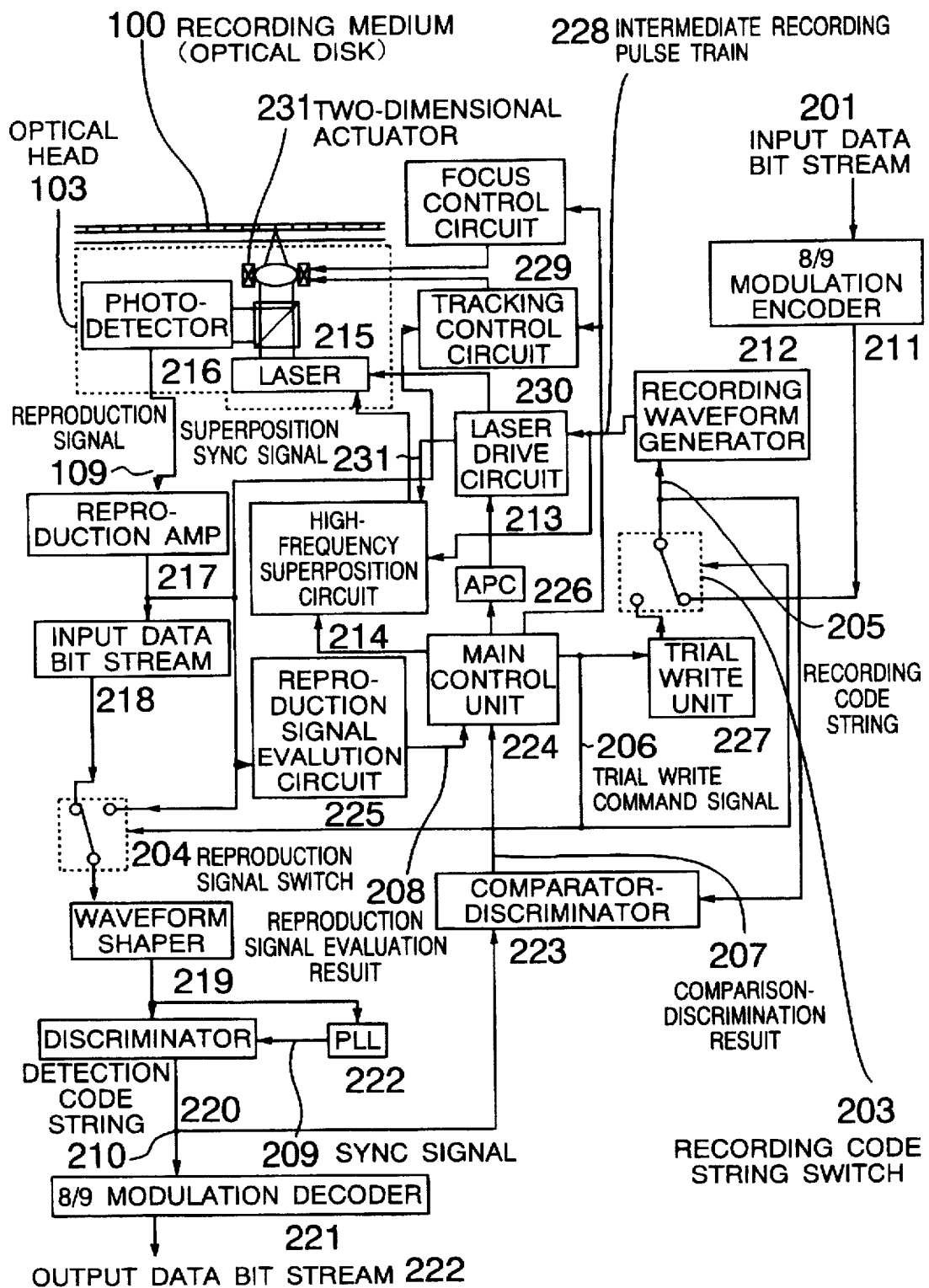
FIG. 2 is a block diagram showing an example of the recording process according to the invention.

FIG. 2 is a diagram for explaining the details of the recording processing system 106 in FIG. 1. The optical head 103 focuses the laser beam emitted from a laser source 215 on the recording medium (optical disk) 100. In normal information recording mode, the input data bit stream 201 is applied to an 8/9 modulation encoder 211, and the resulting output in the form of the recording code string 205 is led to a recording waveform generator 212, thereby generating an intermediate recording pulse train 228 corresponding to the recording waveform. This intermediate recording pulse train 228 is applied to a laser drive circuit 213 and a high-frequency wave superposition circuit 214, so that a laser beam of an emission power level corresponding to the recording code string 205 is finally emitted from the laser source 215. Also, the high-frequency wave superposition circuit 214 obtains a superposition sync signal 231 from the laser drive circuit 213 and superposes a high-frequency current synchronous with the phase of the recording light pulse on the drive current of the laser source 215.

In the information reproduction mode, the laser beam reflected from the recording medium (optical disk) 100 is led to a photo detector 216 and converted into an electrical signal. This signal is applied to a reproduction amplifier 217, the output of which is led to a waveform equalizer 218, a reproduction signal switch 204, a reproduction signal evaluation circuit 225 and a tracking control circuit 230. The same signal, together with a signal from a main control unit 224 described later, is applied to the tracking control circuit 230 and used for the tracking operation to scan on the recording medium. The reproduction signal switch 204, on the other hand, is controlled by a trial write command signal 206 and operates to apply the output signal of either the reproduction amplifier 217 or the waveform equalizer 218 to a waveform shaper 219. During the normal information reproduction, the waveform shaper 219 is connected with the output of the waveform equalizer 218. This signal is converted into a pulse signal representing the presence or absence of a signal at the waveform shaper 219. This pulse signal is applied to a discriminator 220 and a PLL 222. The sync signal 209 (synchronous with the basic period of the pulse signal) output from the PLL 222 is applied to the discriminator 220. The discriminator 220 generates a detection code string 210 from the pulse signal and the sync signal 209, which signal is finally converted into an output data bit stream 202 by means of an 8/9 modulation decoder 221. Also, the detection code string 210 output from the discriminator 220 is compared with and discriminated from the recording code string 205 at a comparator/discriminator 223. The result 207 of comparison/discrimination is applied to the main control unit 224. The main control unit 224, by reference to the result of comparison/discrimination, starts optimization of the recording condition by the trial write operation in the case where there is a difference between the recording code string 508 and the detection code string 210, i.e., in case of an error.

With the start of an operation for optimizing the recording condition by the trial write operation, the recording code string switch 203 is switched by a trial write command signal 206, and the output of a trial write unit 227 is connected to the input of the recording waveform generator 212. The trial write unit 227 outputs a predetermined recording code string corresponding to a trial write pattern, and the trial write pattern is recorded in a predetermined trial write area on the recording medium 100. In the process, the main control unit 224 controls the recording/reproduction conditions through an APC 226, a focus control circuit 229 or the tracking control circuit 230, thereby performing the trial write operation under different recording conditions. The reproduction signal 109 from this trial write area is amplified at a reproduction amplifier 217 and then the recording/reproduction condition applied to the reproduction signal evaluation circuit 225 is evaluated. The reproduction signal evaluation result 208 is returned to the main control unit 224. On the basis of the result of evaluation, the main control unit 224 controls the above-mentioned recording/reproduction condition, and once the quality of the reproduction signal exceeds an allowable level, the operation for optimizing the recording condition is completed and the normal recording/reproduction operation is restored.

The operation for optimizing the recording condition may alternatively be performed by comparing the difference between the recording code string 205 and the detection code string 210. In such a case, with the start of the optimization operation for the recording condition by the trial write operation, the recording code string switch 203 and the reproduction signal switch 204 are switched by the trial write command signal 206, so that the output of the trial write unit 227 is connected to the input of the recording waveform generator 212 and the output of the reproduction amplifier 217 to the input of the waveform shaper 219. The output of the reproduction signal switch 204 operates to output the output signal of the reproduction amplifier 217 directly in order to improve the accuracy of detection of the optimum recording condition. The recording code string 205 output from the trial write unit 227 and the detection code string 210 output from the discriminator 220 are applied to the comparator/discriminator 223, and the result of comparison/discrimination 207 is led to the main control unit 224. The main control unit 224 controls the above-mentioned recording/reproduction condition in such a manner that there is no difference between the recording code string 205 and the detection code string 210. As a result, if the difference between the recording code string 205 and the detection code string 210 is removed, the operation for optimizing the recording conditions is completed and the normal recording/reproduction operation is restored.

Figure 3:
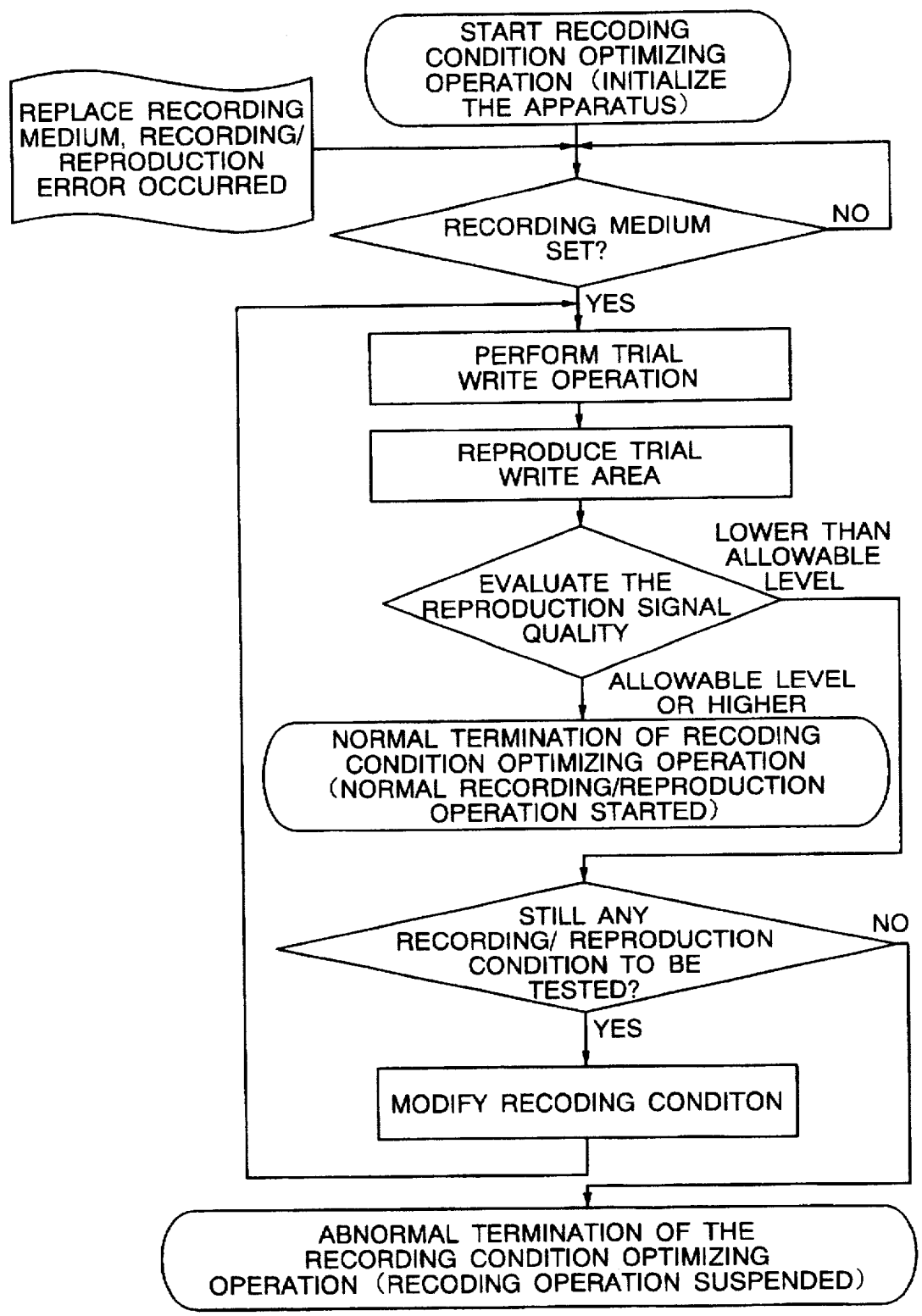
FIG. 3 is a flowchart showing an example operation of an apparatus according to the invention.

Now, an example operation of an apparatus according to the invention will be explained with reference to FIG. 3. Upon initialization of the apparatus by turning on the power supply of the apparatus, a decision is made whether a recording medium is set in the apparatus, and if the recording medium is not yet set in the apparatus, the apparatus is left in a stand-by state. In the case where the recording medium is set in the apparatus, the operation for optimizing the recording condition is performed in order to confirm the adaptability between the recording medium and the apparatus. The operation for optimizing the recording condition is performed by controlling the recording conditions including the recording power level or the focus offset amount in such a manner as to minimize the variations of the recording mark caused by the variations in the recording sensitivity of the recording medium which in turn is attributable to the variations in the thickness of the recording film of the recording medium or the environmental temperature. In addition, the operation for optimizing the recording condition is intended to reduce the variations in the operation characteristics of the recording apparatus. In the operation for optimizing the recording condition, a predetermined trial write pattern is actually recorded on the medium, and the optimum recording condition is determined with the evaluation result of the reproduction signal from that portion as an evaluation parameter. In the case where the evaluation of the reproduction signal quality shows that an allowable level for guaranteeing the normal operation of the apparatus is exceeded, the regular recording/reproduction operation of the apparatus is started. Also, the recording code string and the detection code string are compared with and discriminated from each other, and in the case where any difference is detected between them, a trial write operation is performed to optimize the recording condition. The operation for optimizing the recording condition is performed also at appropriate time intervals or when the recording medium is replaced. These series of operation can form a minuscule recording mark stably and improve the reliability of the recording information.

Figure 4A:
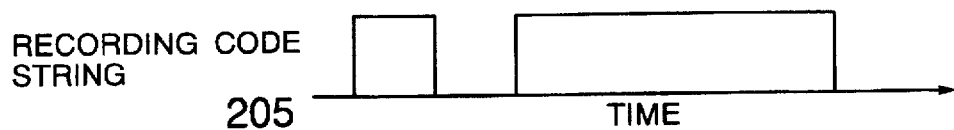
FIGS. 4A to 4G are schematic diagrams showing an example of a recording scheme and a recording mark recorded according to the invention.
Figure 4B:
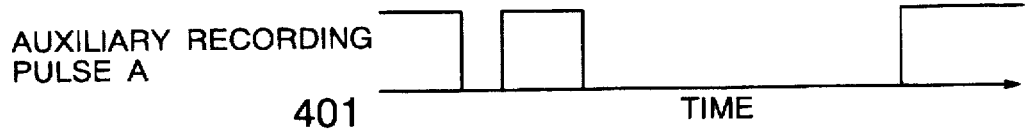
Figure 4C:
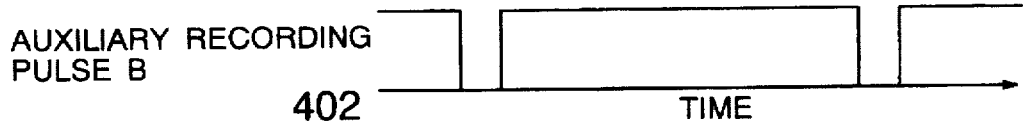
Figure 4D:
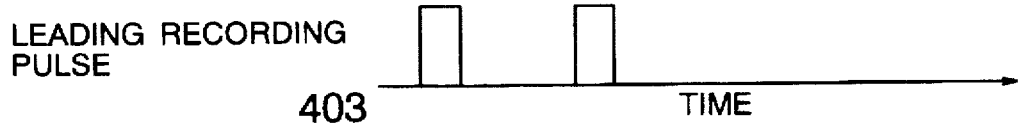
Figure 4E:
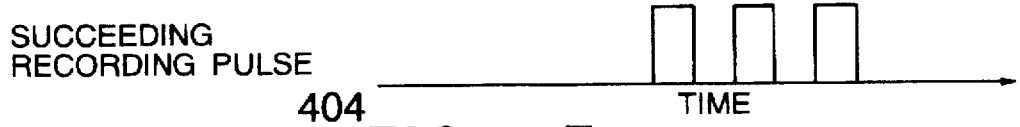
Figure 4F:
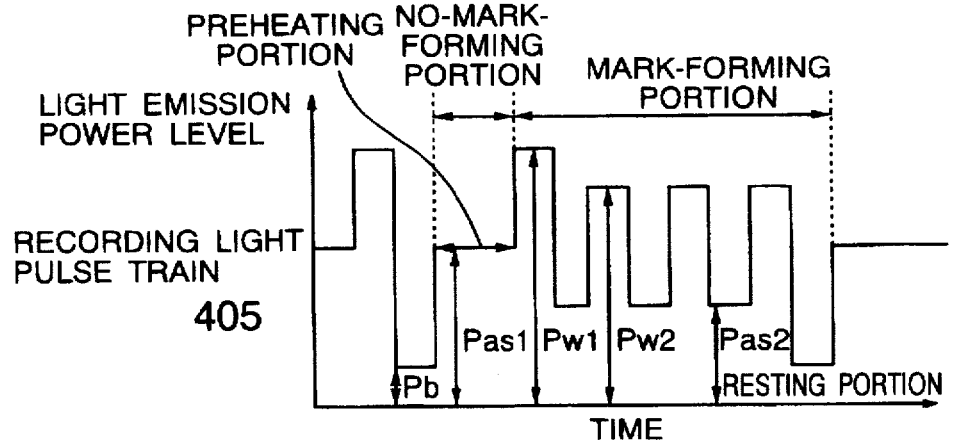
Figure 4G:
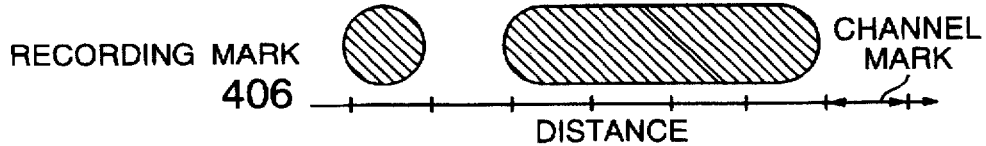
Figure 4H:
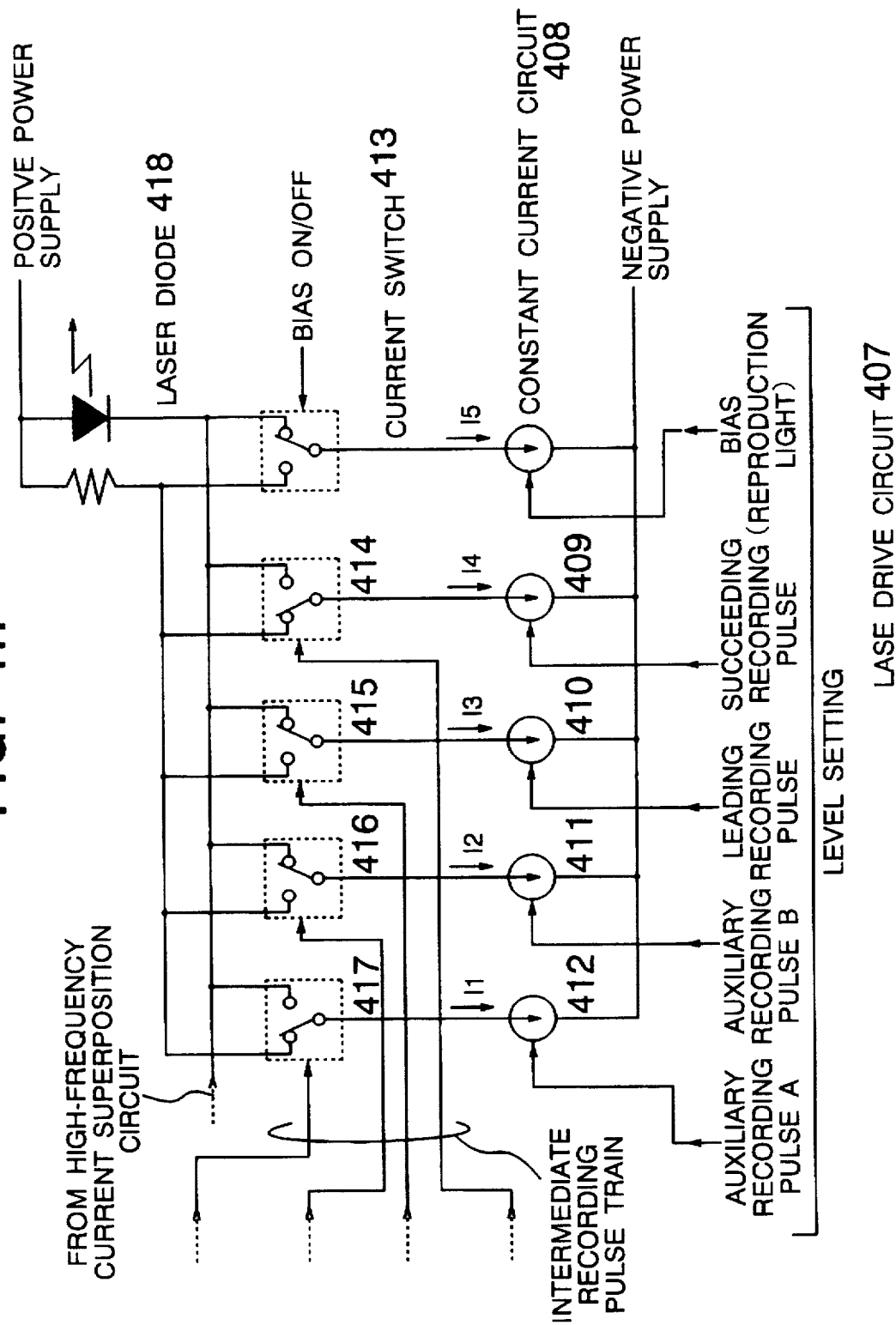
FIG. 4H is a connecting diagram for explaining an example of a laser driving circuit related to FIGS. 4A to 4G.

The waveform of a recording light pulse train according to the invention and an example of a corresponding laser drive circuit will be explained with reference to FIGS. 4A to 4H. An example of the recording light pulse train according to the invention is shown in FIG. 4F. In a series of pulses forming a recording mark, the first pulse has a light emission power level different from the second and subsequent pulses, and a single recording light pulse can accommodate the change in the mark length of the channel bits. Further, a rest portion is provided immediately after the last fall of the recording mark formation of a recording light pulse train forming a single recording mark, with the result that the heat flow into the neighborhood of the rise point at the head of the recording light pulse train forming the subsequent recording marks is kept substantially constant. The temperature of the recording film on the recording medium is thus kept substantially constant during the formation of a mark. Thus, the width of the recording mark becomes controllable and the amplitude of the reproduction signal is stabilized. Also, the duty factor of the pulse train at the recording mark formation section is about 50%. In view of the fact that the length of the rest portion is equivalent to about one half of the channel bit length, the recording clock period used for converting a recording code string into a recording light pulse train is sufficiently equal to the shortest recording mark/gap length. This leads to an advantage in terms of the cost of the recording circuit for improving the information transfer rate as well as the recording density. In the operation for optimizing the recording condition, the optimization of the light emission power levels Pw1, Pw2, Pas1, Pas2 and Pb of each part of the recording light pulse train as well as the focus offset amount can control the length and width of the recording mark on the recording medium with high accuracy. FIG. 23A shows the result of a simulation performed of the recording mark style by the heat calculations assuming a layered structure of a conventional recording medium. The ratio of light emission power level involved is Pas:Pw1:Pw2=1.00 :1.78:1.95. The diameter of the recording mark formed by each recording light pulse is substantially uniform and contributes to a satisfactory recording operation. FIGS. 23B and 23C show the result of simulation for the ratios of Pas:Pw1:Pw2=1.00 1.70:1.95 and Pas:Pw1:Pw2=1.00:1.90:1.95, respectively. In these cases, the balance of power level between the pulse for the preheating portion and the first pulse is disturbed in the recording light pulse train forming continuous recording marks, and the mark width at the start of a series of the continuous recording marks is different from that of the other parts. Under this condition, a shift caused in the edge position of the reproduction signal makes the correct reproduction of information impossible. The ratio Pw1/Pas between the first light emission power level Pw1 and the light emission power level Pas of the pulse for the preheating portion must be at least 1.70 or more but 1.90 or less. FIGS. 23D and 23E show the cases for the ratios of Pas:Pw1:Pw2=0.56:1.00 1.07 and Pas:Pw1:Pw2=0.56:1.00:1.13, respectively. In these cases, the balance is disturbed between the light emission power level Pw1 of the first pulse and the power level Pw2 of the second pulse in the recording light pulse train forming continuous recording marks. The widths of a series of continuous recording marks are thus not constant. Under this condition, the information reproduction is made impossible by the level variations of the reproduction signal. The ratio of the light emission power level between the first and second pulses, therefore, is required to be at least 1.07 or more but 1.13 or less.

Now, an example configuration of the laser drive circuit 407 will be explained with reference to FIGS. 4A to 4H with regard to the case in which a recording mark 406 is formed for the recording code string 205 output from an 8/9 modulation encoder. A recording waveform generator generates an auxiliary recording pulse A 401, an auxiliary recording pulse B 402, a leading recording pulse 403 and a succeeding recording pulse 404 providing an intermediate recording pulse train 228, and controls the laser drive circuit 407. In the laser drive circuit 407, the currents I1, I2, I3, I4 and I5 flowing in constant current circuits 408 to 412 are set to an appropriate level taking into consideration the current-light conversion efficiency of the laser diode 418 and the efficiency of the optical head in accordance with the light emission power levels Pw1, Pw2, Pas1, Pas2 and Pb for each part of the recording light pulse train 405. Current switches 413 to 417 are opened or closed by means of the intermediate recording pulse train 228 to control each current to be supplied or not to be supplied to a laser diode 418. The laser drive current is the sum of the currents flowing in the current switches 413 to 417, and therefore a recording light pulse train 405 is finally obtained. Also, as described later, the current switches 413 to 417 are adapted to be turned on and off by being connected to an appropriate high-frequency pulse signal source thereby to superpose a high-frequency current for controlling the laser noise.

Figure 5A:
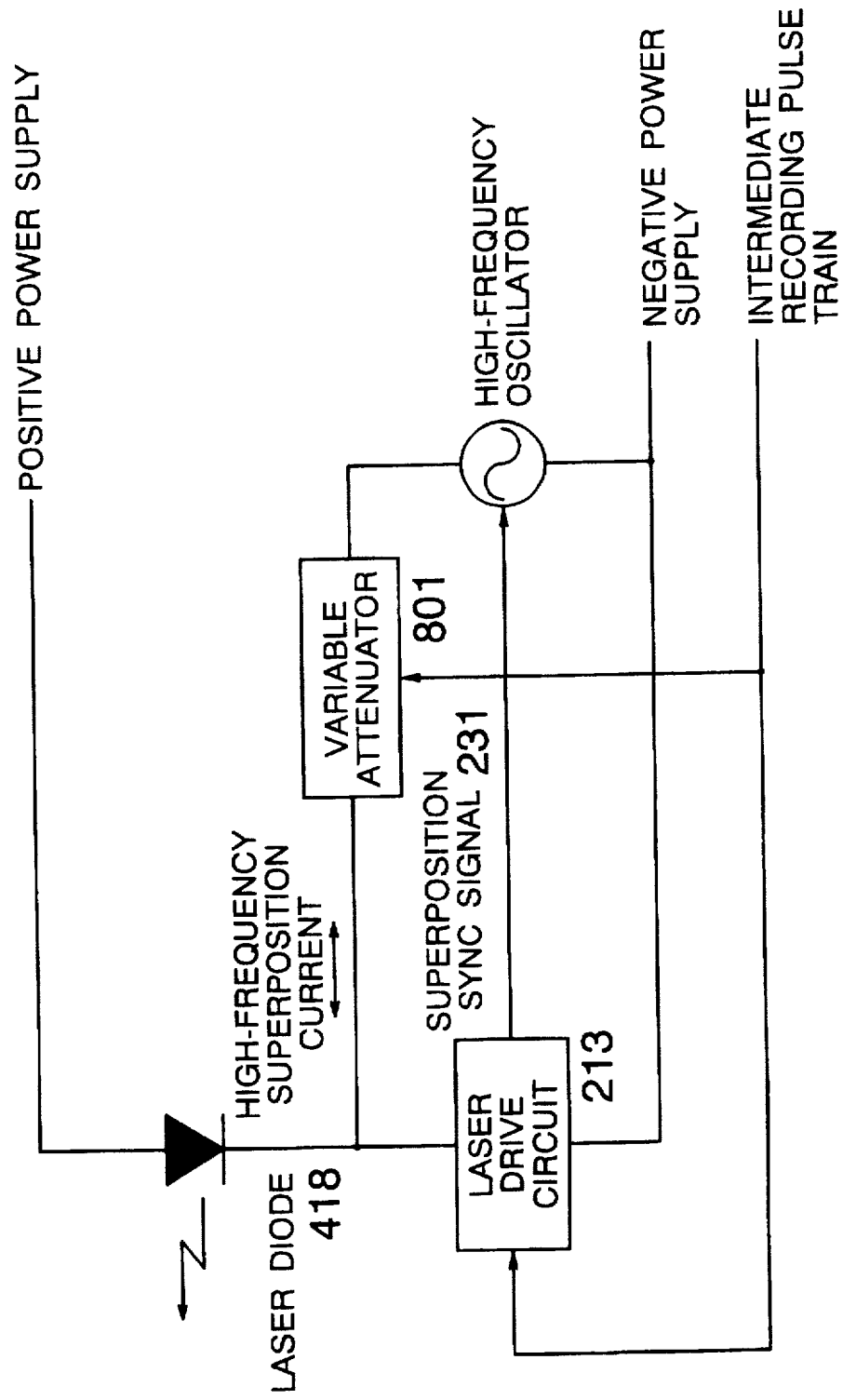
FIGS. 5A and 5B are block diagrams showing an example configuration of a high-frequency superposition circuit according to the invention.
Figure 5B:
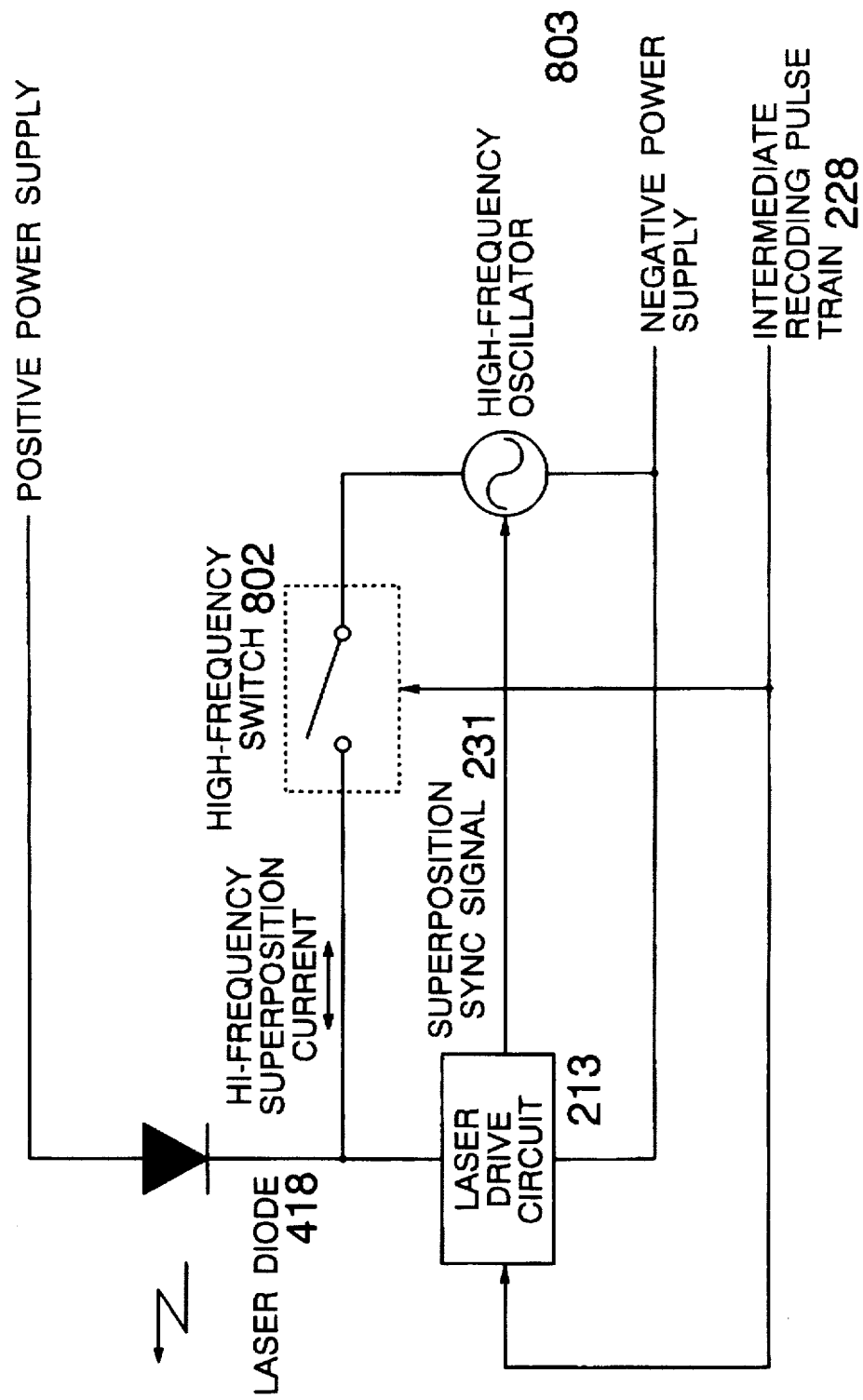

The minuscule recording mark intended for according to the invention has the boundary thereof determined at a portion with a gentle temperature gradient of the temperature distribution formed on a recording medium by the irradiation of a laser beam. As a result, a mere minuscule fluctuation of the temperature distribution causes a considerable change in the recording mark style formed. It is therefore necessary to stabilize the power level of the recording light pulse. One method for stabilization may be to superpose a high-frequency current on the laser drive current also at the time of recording. An example configuration of the high-frequency superposition circuit according to the invention is shown in FIGS. 5A and 5B. A high-frequency oscillator 803 obtains a superposition sync signal 231 from the laser drive circuit and oscillates in phase with the recording light pulse. The oscillation frequency of the high-frequency oscillator 803 is a multiple by a natural number of the recording clock frequency used for generating the intermediate recording pulse train 228, and to be such a specified high frequency as to stabilize each level of the recording light pulse. In the case where the high-frequency oscillator 803 is not in phase with the recording clock providing a time reference for converting a recording code string into a recording light pulse train, the heat amount applied to the recording film by each recording light pulse varies with the phase relationship between the recording code string and the recording light pulse train. In such a case, variations occur in the recording mark size formed by each recording light pulse making it difficult to form a high-accuracy recording mark. Therefore, the high-frequency oscillator 803 is required to oscillate in synchronism with the recording clock. The synchronizing means may alternatively be the same high-frequency signal source as the above-mentioned recording clock appropriately divided in frequency, instead of the PLL or the like. The output of the high-frequency oscillator 803 is connected through a variable attenuator 801 or a high-frequency switch 802 to one of the drive terminals of the laser diode 418 as well as to the laser drive circuit 213 for generating a recording light pulse train. As a consequence, the current flowing in the laser diode 418 is the sum of the current due to the laser drive circuit 213 and the current due to the high-frequency oscillator 803. For the service life of the laser diode 418 to be secured, the light emission power peak level of the recording light pulse train is preferably as low as possible. In view of this, as described later, the variable attenuator 801 or the high-frequency switch 802 controls the amount of the superposed high-frequency current by reference to the intermediate recording pulse train 228 generated from the recording waveform generator, and operates in such a manner that the peak level is less than a predetermined value. In the example under consideration, the apparatus is configured to control the amount of high-frequency current superposition using the variable attenuator 801 or the high-frequency switch 802. As an alternative, however, the output of the high-frequency oscillator 803 may be directly modulated by the intermediate recording pulse train 228. Also, the application of the configuration under consideration is not limited to the light modulation scheme but is equally effective in the recording operation using the light pulse magnetic field modulation scheme.

The operation for superposing a high-frequency current on a laser drive current at the time of recording will be explained by referring to FIGS. 6A to 6I as an example. Consider the case in which a recording mark 406 is formed for a recording code string 205 output from an 8/9 modulation encoder. A recording waveform generator generates auxiliary recording pulses A 401, auxiliary recording pulses B 402, leading recording pulses 403 and succeeding recording pulses 404 providing an intermediate recording pulse train thereby to control the laser drive circuit. In addition to these pulses, a high-frequency oscillation circuit generates high-frequency superposition pulses 601 in phase with the recording pulse train. Laser drive current waveforms 602, 603, for example, can be obtained by controlling a high-frequency switch 802 or a variable attenuator 801 in FIG. 5 using the result of appropriate calculation within the framework of the intermediate recording pulse train 228. The laser drive current waveform 602 is obtained by reducing the amount of high-frequency current superposition at the portion of the leading recording pulse 403 or the succeeding recording pulse 404, calculating the logic sum (OR) between the leading recording pulse 403 and the succeeding recording pulse 404, and then controlling the variable attenuator 801 in FIG. 5A by the resulting pulse. The laser drive current waveform 603, on the other hand, is derived, for example, by controlling the high-frequency switch 802 in FIG. 5B using the result of the logic sum (OR) calculation between the leading recording pulse 403 and the succeeding recording pulse 404 while controlling the high-frequency oscillator 803 using the leading recording pulse 403 and the succeeding recording pulse 404. The laser drive current waveform 603 is alternatively obtainable by the logic sum calculation between the leading recording pulse 403 or the succeeding recording pulse 404 and the high-frequency superposition pulse 601, and turning on-off the current switches 409, 410 in FIGS. 4A to 4H using the resulting pulse. The aforementioned operation is capable of minimizing the laser diode drive current, securing the service life of the laser diode while superposing a high-frequency current on the recording laser current, stabilizing the light emission power level of the recording light pulse train, and realizing the stable formation of uniform minuscule recording marks.

Figure 7D:
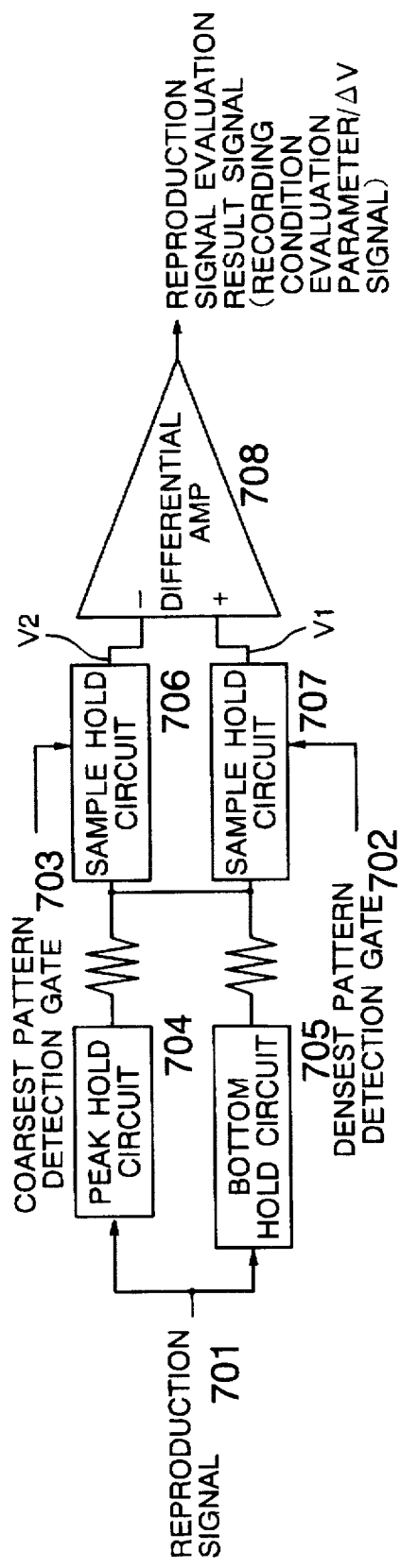
FIG. 7D is a diagram for explaining an example of a conventional reproduction signal evaluation circuit.
Figure 7E:
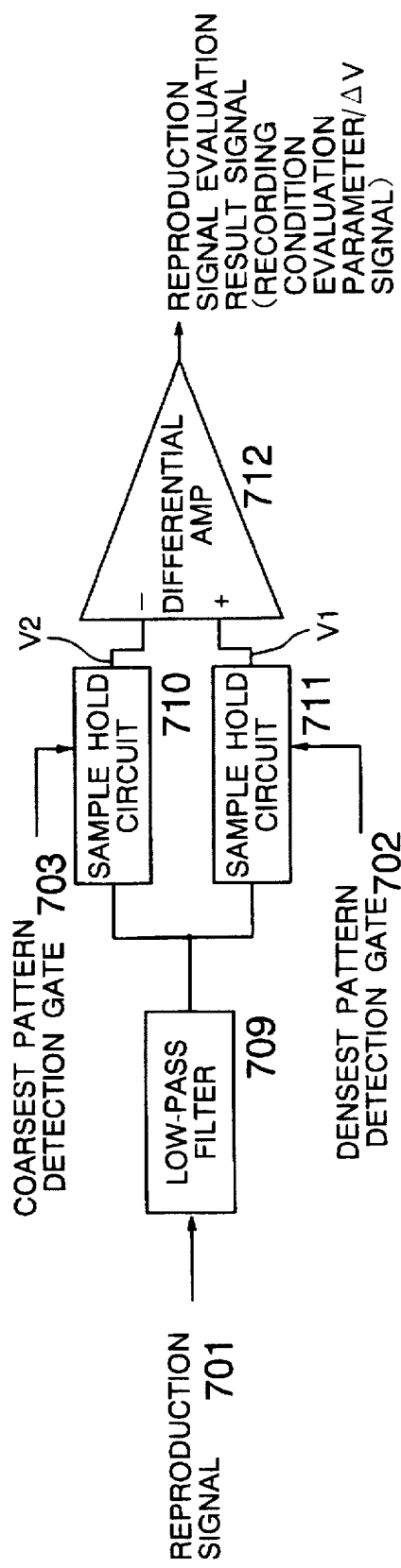
FIG. 7E is a diagram for explaining a reproduction signal evaluation circuit according to the invention.

Returning to FIGS. 7A to 7E, explanation will be made about the operation for evaluating the conditions for the light emission power level of the recording light pulse train by evaluating the reproduction signal at the time of optimization of the recording condition. As described above, in the case of a high recording power level, both the width and length of the recording mark increase. The reproduction signal, therefore, shifts toward the recording mark side, and the period of the recording mark lengthens at the same time. In the case where the recording power level is low, on the other hand, the width of the recording mark is narrowed with the length decreased, with the result that the reproduction signal shifts away from the recording mark while the recording mark period decreases at the same time. Consequently, it is possible to decide whether the recording condition is appropriate by checking the period or level of the recording mark portion of the reproduction signal. Assuming that the channel bit length (the shortest change length of the recording mark=detection window width) is Tw, the shortest and the longest recording mark/gap lengths are given as 1Tw and 7Tw respectively using the 8/9 block modulation scheme explained below as a modulation scheme. Now, consider the case in which the recording mark/gap with 1Tw and 7Tw length are repeated as a trial write pattern. Assuming that the bit length of the recording code string is 0.40 microns, the channel bit length, i.e., the shortest recording mark length is 0.35 microns. Also, assuming that the wavelength of the laser involved is 680 nm and the lens NA is 0.55, it is difficult to optically resolve the shortest recording mark to identify the position of the recording mark. An apparatus according to the invention uses the PR(1,1) scheme as a reproduction system, so that the central level of the reproduction signal from the densest pattern requiring no optical resolution desirably coincides with the central level of the amplitude of the reproduction signal from the repetitive pattern of the recording mark/gap having a resolvable length of at least 2Tw. An example configuration of a reproduction signal evaluation circuit according to the invention is shown in FIG. 7E. As mentioned above, even when the balance between the recording mark and the gap length is somewhat disturbed as a result of small displacement from the optimum recording condition, the central level of the reproduction signal amplitude substantially remains unchanged. In view of this, the signal levels of the densest/coarsest patterns are sample-held respectively to generate a reproduction signal evaluation signal 714 (ΔV signal) using a low-pass filter 709 having a cut-off frequency of an appropriate level lower than the reproduction signal frequency of the coarsest pattern. The reproduction signal evaluation signal 714 is thus obtained from the configuration as shown in FIG. 7E, and the recording condition is controlled in such a manner as to make the same signal zero.

The aforementioned method uses a combination of the densest pattern and the coarsest pattern as a trial write pattern. The trial write pattern, however, is not confined to such a combination. Instead, the repetitive pattern of the recording mark/gap of 2Tw length may be used with the repetitive pattern of the recording mark/gap of 6Tw length. In this way, the ΔV signal providing an evaluation result of the reproduction signal, i.e., an evaluation parameter for the recording condition is detected, and the recording condition is adjusted and optimized by searching for the value of a recording condition with ΔV approaching zero.

Figure 8:
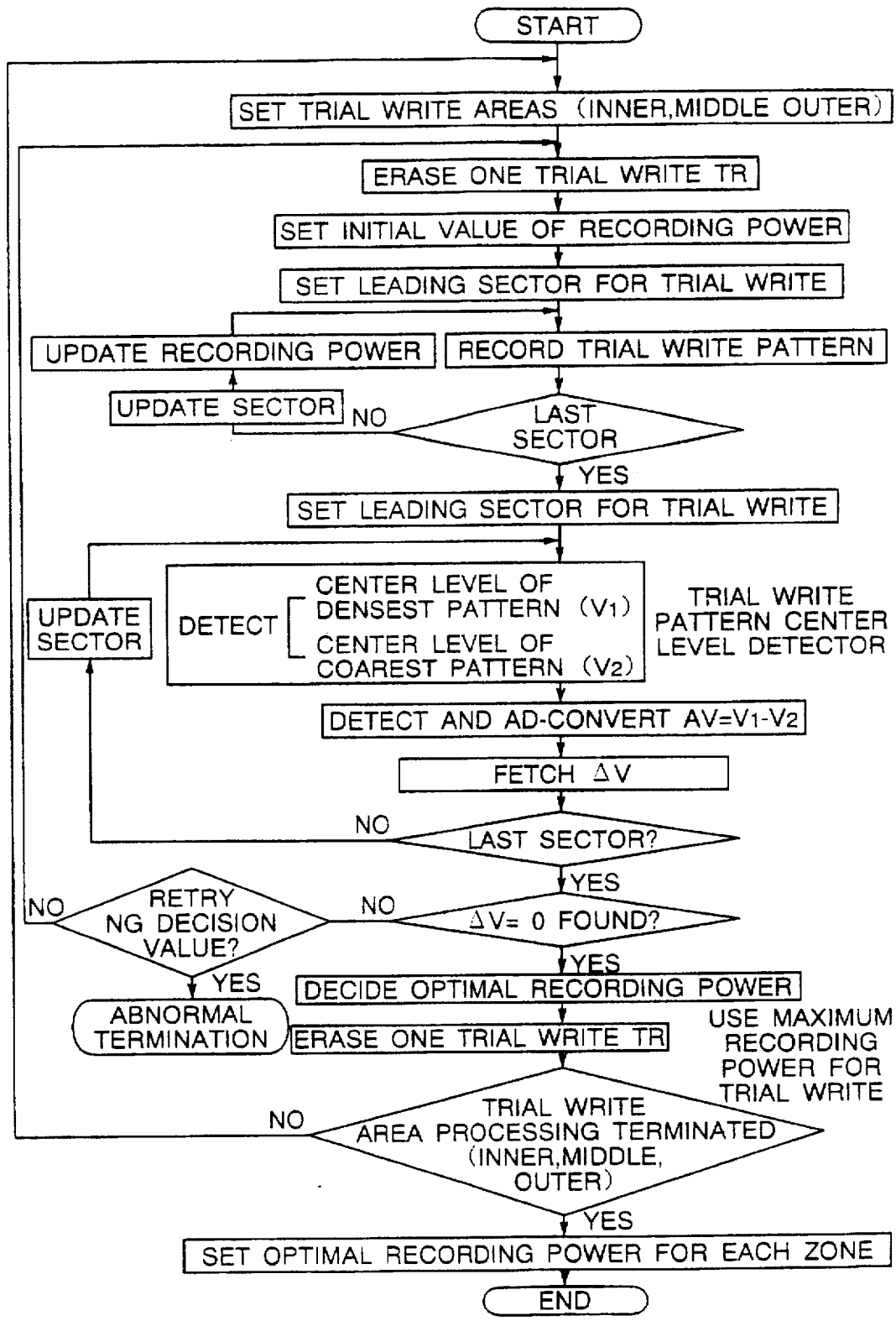
FIG. 8 is a flowchart showing an example process of a conventional trial write operation.
Figure 9A:
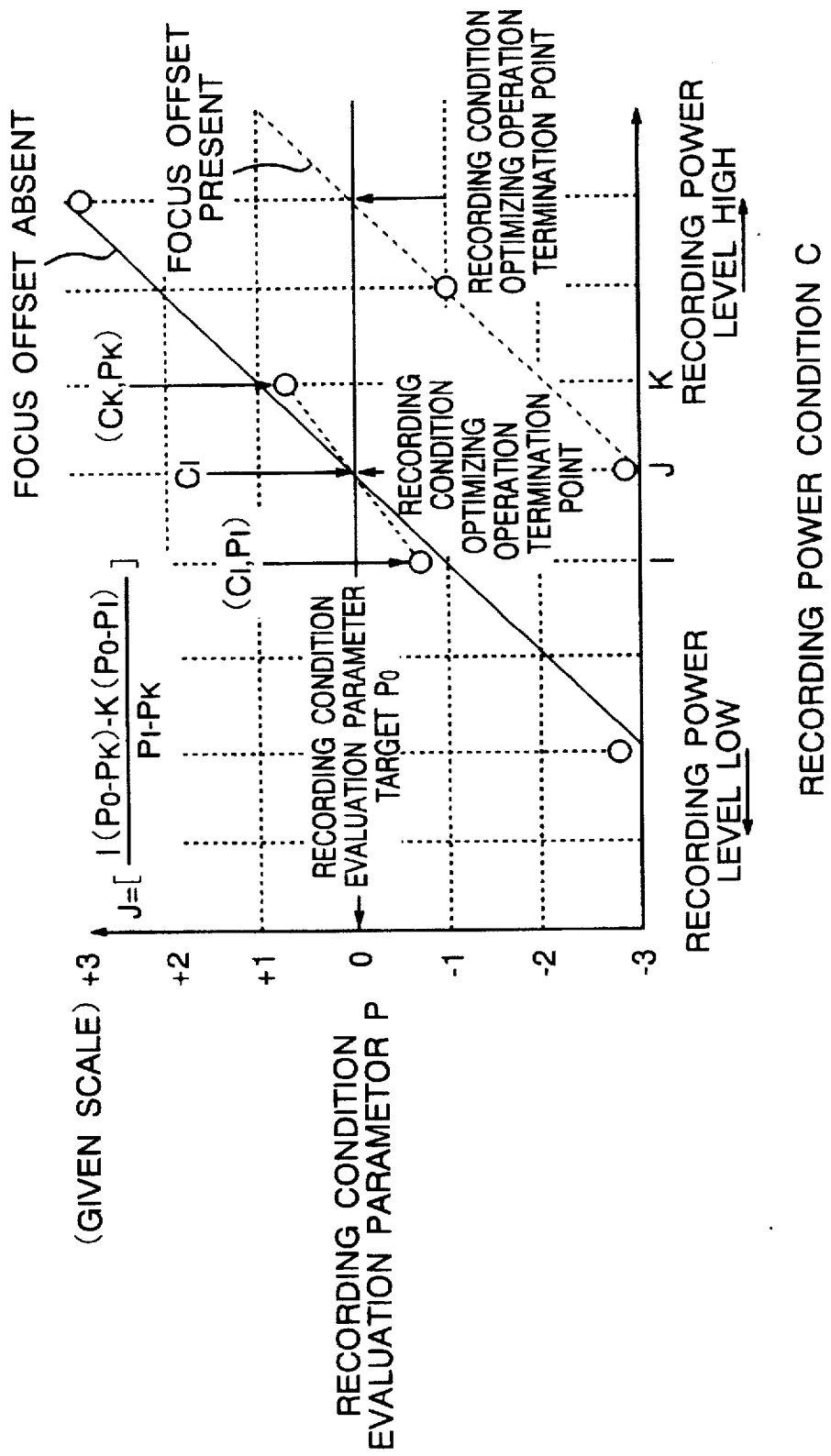
FIGS. 9A and 9B are schematic diagrams showing an example of the trial write operation process according to the invention.
Figure 9B:
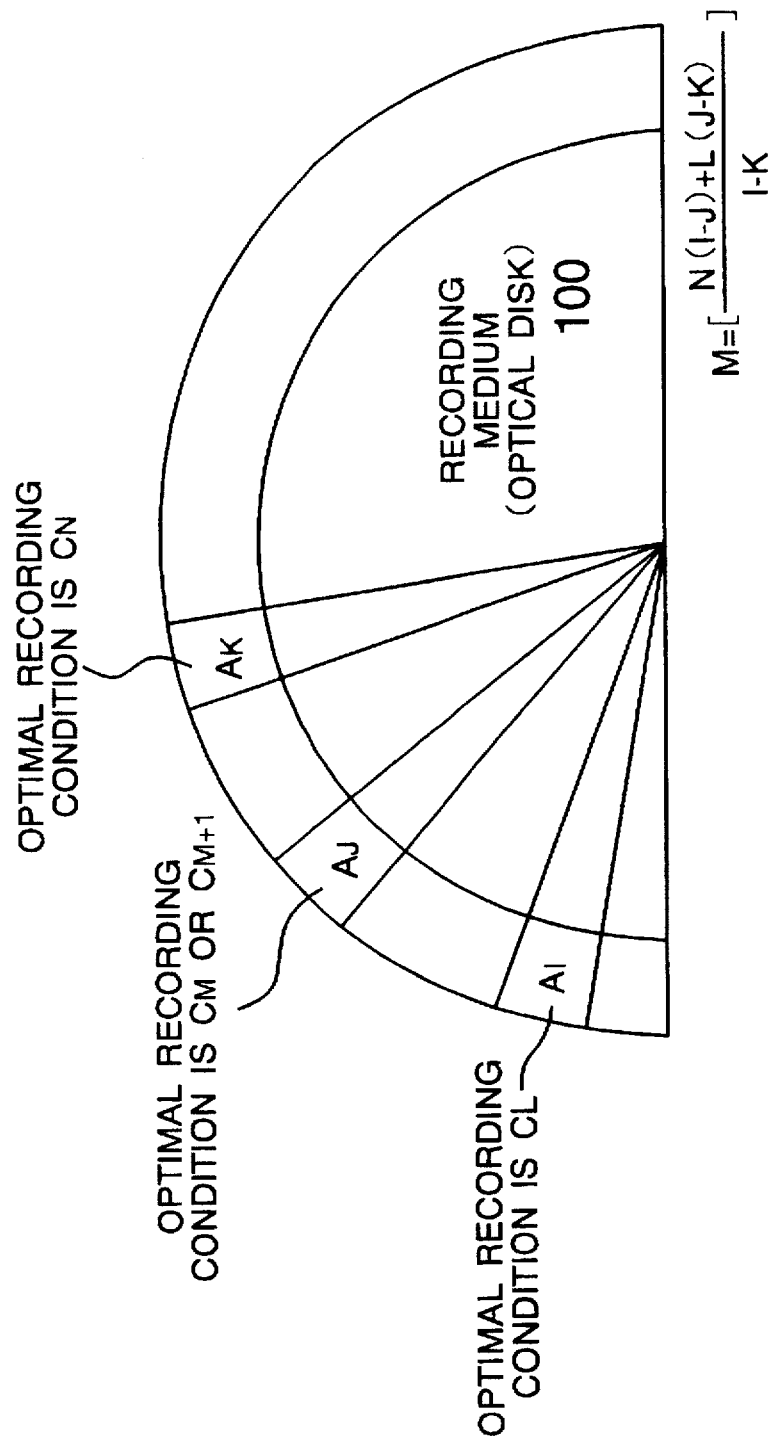

Now, explanation will be made about the operation for optimizing the recording condition by trial write operation. The conventional process of operation for optimizing the recording condition is shown in FIG. 8. In the case where a minuscule recording mark which is even smaller than in the prior art is to be formed on an optical disk, the problem is posed by the variations in recording sensitivity along the direction of rotation of the recording medium as well as the variations in recording sensitivity between recording media. In addition to the operation for optimizing the recording condition for each radial position as in the prior art, therefore, the operation of optimization is performed also for each recording area in the direction of rotation of the recording medium to make possible formation of more stable and uniform minuscule recording marks. Even more uniform minuscule recording marks are expected to be obtained by performing these operations for optimizing the recording condition at narrower intervals in terms of time, recording condition and the recording position. This increases, however, the overhead of the inherent recording/reproduction operation of the apparatus. A method for reducing the burden of the operation for optimizing the recording condition will be explained with reference to FIGS. 9A and 9B.

Assume, for example, that there are a number p of recording conditions (recording power levels, in particular) C available for the apparatus, and that the recording condition evaluation parameter Pi undergoes a substantially monotonic change with respect to Ci (the ith recording condition, where i=1, 2, 3, ..., p). In this case, the trial write operation need not be carried out for all of the number p of the recording conditions Ci but at appropriate intervals. When the relation of magnitude between the recording condition evaluation parameter Pi and the optimum value PO is inverted with the recording condition Ci appropriately changed, then the trial write operation is completed and the optimum recording condition Cj is estimated by interpolation. This process will be explained with reference to FIG. 9A. Specifically, assume that the sign of Pi−PO is different from that of Pk−PO where Pi and Pk are the recording condition evaluation parameter P with the recording performed under the recording conditions Ci and Ck (i and k are a natural number of p or less) respectively and PO is a target value of the recording condition evaluation parameter P. The optimum recording condition can be estimated to be Cj or $C_{j+1}$ where j is given as j=[{i(PO−Pk)−k(PO−Pi)}/(Pi−Pk)] ([ ]: Gauss's brackets). This process reduces the number of trial write operations and realizes a high-speed operation for optimizing the recording condition. Also, Pi may be assumed to change as a function other than a linear function with respect to i unlike in the foregoing description.

Further, consider the case in which there exists a focus offset at the time of trial write operation. As far as the amount of focus offset remains within a predetermined range, the optimum recording condition is obtained for the particular state by performing the operation for optimizing the recording condition, and an expected style of recording mark is formed on the recording medium. The operation for optimizing the recording condition in such a case is shown by dashed line in FIG. 9A. Nevertheless, the state accompanied by a focus offset is the one in which the resolution of the recording/reproduction optical system is reduced and is not desirable. It is therefore preferable to carry out the operation for optimizing the recording condition covering the amount of focus offset by trial write. The optimum recording condition obtained as a result of the recording condition optimizing operation in the presence of an offset is different from that in the absence of such an offset. This difference is reflected in the recording power level in particular, so that the overall recording power level is higher in the presence of an offset than in the absence of an offset. It is thus possible to obtain the optimum focus condition and to form even more stable, uniform minuscule recording marks by adjusting the amount of focus offset to reduce the recording power level for the optimum recording condition as far as possible.

In the case where there are a number q of recording areas A each constituting a unit of recording management on the recording medium, the trial write operation is not performed for all of the recording areas Ai (Ai: the ith recording area, where i=1, 2, 3, . . . , q) but only for the recording areas Ai and Ak in appropriate spaced relationship with each other. Assuming that the resulting recording conditions obtained are Cl and Cn respectively, the optimum recording condition C for the recording area Aj between Ai and Ak can be estimated by interpolation. More specifically, the optimum recording condition for each recording area Aj (j not less than i but not more than k) can be estimated to be Cm or $Cm_{+1}$ where m is given by m=[{n(i−j)+l(j−k)}/(i−k)]([ ]: Gauss's brackets). In the case under consideration, the optimum recording condition C for each recording area Ai is assumed to be distributed as a linear function with respect to i. In spite of this, a more complex form of function may be assumed for Ci. It is also not necessary that the distance between recording areas is constant for trial write operation. In this way, the optimum recording condition can be estimated by interpolation from the positions of representative points and the optimum recording conditions for these particular points thereby to realize a higher-speed operation for optimization of the recording condition.

As described above, means for recording control, trial write operation and reduction of recording laser noise can be combined to form minuscule recording marks stably and with high accuracy with a style-controlled minimum mark having a diameter of 0.35 μm on an optical disk.

Explanation will be made about a specific method for reproducing the recording data from this recording mark using the 8/9 block modulation scheme as an example. The explanation of this embodiment refers to the case in which PR(1,1) in PR class 1 is first applied to an opto-magnetic disk.

Figure 10:
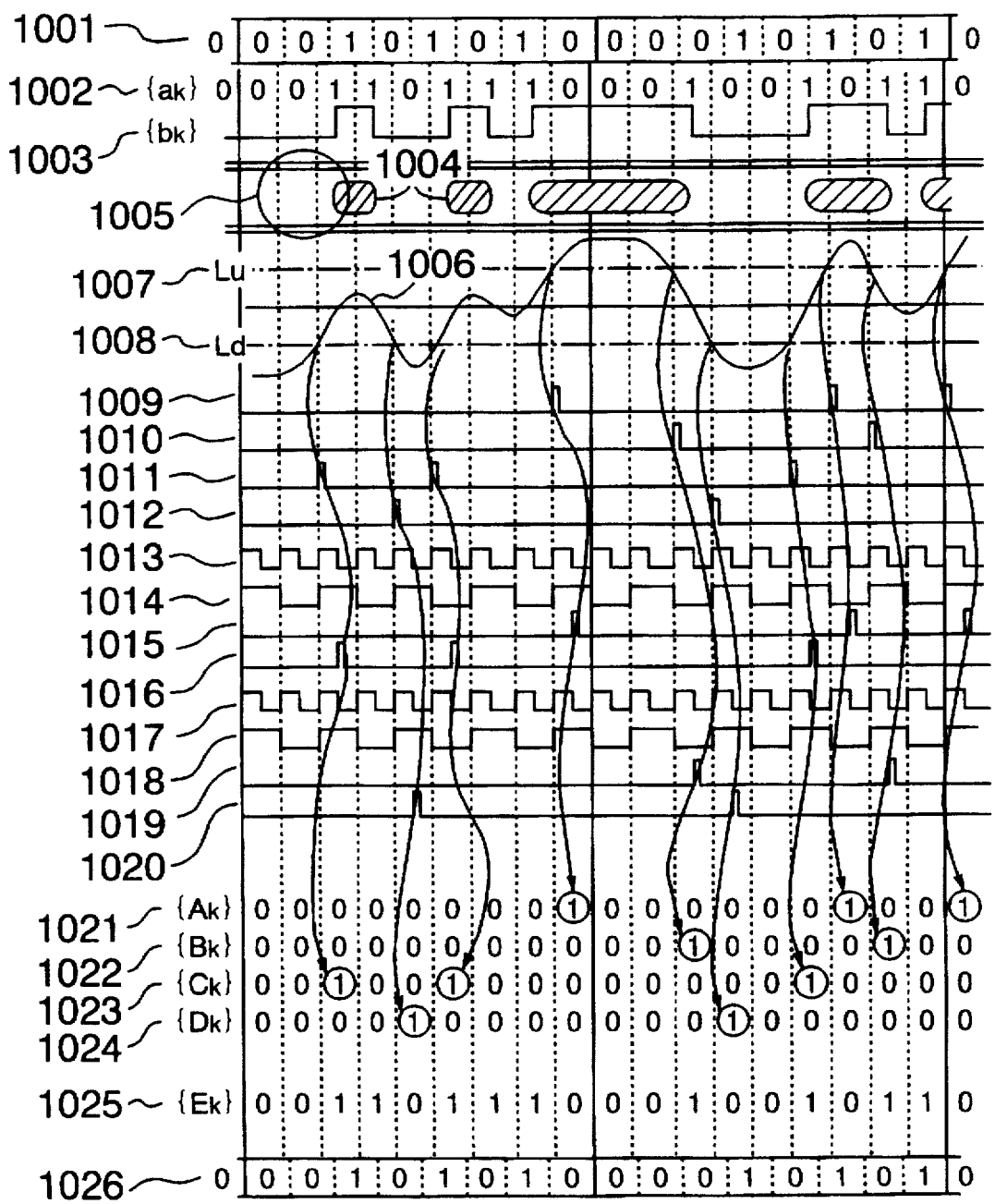
FIG. 10 is a diagram showing waveforms for explaining the flow of process for a reproduction signal processing system according to a first embodiment.

As shown in FIG. 10, the 8/9 block modulation is such that a data bit stream 1001 to be recorded is separated into 8-bit blocks, each of which in turn is converted into a 9-bit channel bit stream {ak} 1002 (k is a time variable with the channel bit interval T as a unit, and ak is a binary variable taking the value of "0" or "1"). FIG. 10 shows a data bit stream of 0010101000010101 representing two bytes as an example. The conversion into the channel bit streams is based on a specific conversion table for 8/9 modulation described later. In PR(1,1) application, a method is normally used in which the precoding process is executed only once for the channel bit stream {ak}. More specifically, assuming that the intermediate stream after precoding process is expressed as {bk}, bk is given as equal to ak+bk−1 (where+ indicates an exclusive OR or modulo-2 addition). The precoding process is equivalent to carrying out the NRZI modulation for inverting the polarity at the position of bit "1" for the channel bit stream {ak}. The latter case is shown in FIG. 10. The intermediate bit stream {bk} thus obtained is used as a main recording pulse train 1003 to form recording marks 1004. Upon reproduction of the recording marks 1004 by means of a reproduction light spot 1005, a reproduction signal waveform 1006 is produced. The shown reproduction signal waveform 1006 is the one after compensating the optical characteristics into PR(1,1) by means of an equalizer described later. Comparison between the channel bit stream 1002, the recording marks 1004 and the reproduction signal waveform 1006 shows that bit "0" corresponds to a mark recorded on the optical disk or a gap between two successive marks and that the amplitude levels of the reproduction signal waveform correspond to +1 and −1 respectively. Also, bit "1" corresponds to the edges before and after the mark recorded on the optical disk, which is known to correspond to an intermediate level 0 as an amplitude level of the reproduction signal waveform. For this reason, with PR(1,1), in the absence of limitation of the number of continuous bits (hereinafter referred to as "the run number") of "0" and "1" in the channel bit stream, a DC component is generated in the reproduction signal waveform inconveniently having an adverse effect on reproducing the recording data from the reproduction signal waveform. By reason of this fact, the "0" run number and the "1" run number of the channel bit stream after modulation should desirably be as small as possible for the optical disk recording/reproduction channel using PR(1,1).

In the explanation of the embodiment under consideration, the run numbers of "0" and "1" are generally expressed as K (K: positive integral number). The following explanation is concerned with the case in which K=6 as a specific process for generating a conversion table to be used in the 8/9 block modulation scheme.

There are a total of 256 codes that an 8-bit data is capable of assuming. The total number of 9-bit codes, on the other hand, is 512. Therefore, a conversion table can be prepared by selecting a number 256 of 9-bit codes out of 512 and assigning them 8-bit codes. In the process, two types of restraints are imposed in addition to the restrictive conditions of "0" and "1" runs described above.

Restraint (1)

The reproduction signal waveform obtained in correspondence with a 9-bit code should intersect with two upper and lower slice levels Lu 1007 and Ld 1008 at three or more points for deciding three levels of "+1", "0" and "−1" and there should be at least one intersection point with Lu 007 and Ld 1008.

Restraint (2)

The absolute value of the total sum CDS (Codeword Digital Sum) of the amplitude levels of the reproduction signal waveform obtained in correspondence with 9-bit codes should be 3 or less.

FIG. 11 shows the result of classification of 9-bit codes based on the two types of restraints mentioned above and the run numbers of "0" and "1". The restraint (2) is an indicator showing the magnitude of the DC component in the code. The smaller this value, the DC level of the whole reproduction signal is smaller. The numbers of codes associated with CDS=0, 1 and 2 among the 512 nine-bit codes, as shown in FIG. 11, are 70, 126 and 112 respectively for a total of 308. Of all these codes, only 238 codes satisfy both the restraint (1) and the condition for the "0" and "1" run numbers of 6 or less. Eighteen codes (=256−238) are thus selected from the 84 codes of CDS=3. The intersection between Lu and Ld described in relation to the restraint (1) corresponds to an edge reproduction pulse for extracting a clock signal. Therefore, the more the edge reproduction pulses, the more advantageous for generation of reproduction clocks. Eighteen codes are thus selected in the descending order of the number of intersections from the 54 codes satisfying the restraint (1). Some freedom is allowed, however, for selecting 18 codes and a plurality of conversion tables can be created depending on the manner in which 18 codes are selected. An example of conversion table obtained this way is shown in FIG. 12.

With the self-clocking scheme, the edge pulse interval constitutes a factor for determining the stability of clock extraction of a PLL circuit, and is hereinafter generally expressed as a positive integral value L. For the clock to be extracted with stability, L is desirably as small as possible. According to the conversion table shown in FIG. 12, the interval between the front edge pulse and the rear edge pulse obtained as an intersection between Lu and Ld can be 20 or less with the channel bit interval as a unit for both upper and lower sides. More specifically, the value of L=20 can be realized. This conversion table can be used to reduce the interval between the front edge pulse and the rear edge pulse obtained as an intersection between Lu and Ld to below 20 or less with the channel bit interval as a unit for both upper and lower sides. Also, assuming that the channel bit interval is Tw, the mark length and the gap length recorded on the optical disk is restricted to the shortest 1Tw to 7Tw. Since the run number of bits "0" and "1" is limited, the amplitude variation can be detected easily by detecting the envelope of the reproduction signal through a bottom hold circuit and a peak hold circuit when suppressing various amplitude variations caused in the recording/reproduction system using an automatic gain control circuit or the like. The conversion table for the 8/9 block modulation as shown in FIG. 12 may be configured of an exclusive hardware as an encoder or a decoder, or the contents of the conversion table may be stored and held as software in a nonvolatile memory such as ROM. This embodiment, therefore, is not specifically confined to the configuration and the method described above.

Explanation will be made in detail about a method for reproducing the recording data from the edge pulses detected by the upper slice level Lu 1007 and the lower slice level Ld 1008 with reference to FIG. 10. An upper front edge pulse 1009 is produced at the intersection between the upper slice level Lu 1007 and the rise point of the reproduction signal waveform 1006, and an upper rear edge pulse 1010 at the intersection between the upper slice level 1007 and the fall point of the reproduction signal waveform 1006. In similar fashion, a lower front edge pulse 1011 is produced at the intersection between the lower slice level Ld 1008 and the rise point of the reproduction signal waveform 1006, and a lower rear edge pulse 1012 at the intersection between the lower slice level 1008 and the fall point of the reproduction signal waveform 1006. According to this embodiment, the upper and lower front edge pulses and the upper and lower rear edge pulses assume the case in which the slice levels thereof are set in such a manner that respective relative pulse intervals are equal to the channel bit interval. Once the interval between the front edges and between the rear edges of the recording marks are controlled with high accuracy by application of the aforementioned recording control scheme, therefore, the front edge PLL clock 1013 can be synchronized with the upper and lower front edge pulses including the phase thereof at the same time. A front edge detection window 1014 is opened from the front edge PLL clock 1013, and the front edge pulses present in this window are detected as an upper front edge detection pulse 1015 and a lower front edge detection pulse 1016. In this manner, by discriminating a detection pulse as a bit "1" and other pulses as a bit "0", the upper front edge detection data series {Ak} 1021 and the lower front edge detection data series {Ck} 1023 are produced. In similar fashion, the rear edge PLL clock 1017 including the phase thereof can be synchronized with the upper and lower rear edge pulses. A rear edge detection window 1018 is opened from the rear edge PLL clock 1017, so that the rear edge pulses present in this window are detected as an upper rear edge detection pulse 1019 and a lower rear edge detection pulse 1020. Once a detection pulse is discriminated as a bit "1" and the other pulses as a bit "0" in this manner, an upper rear edge detection data series {Ek} 1022 and a lower rear edge detection data series {Dk} 1024 are produced. The reproduction channel bit stream {Ek} 1025 is obtained by carrying out the calculation of Ek=Ak+Bk+Ck+Dk+Ek−1 (where+indicates the exclusive OR or the modulo-2 addition). A reproduction channel bit stream {Ek} 1025 is demodulated to a reproduction bit stream 1026 by 8/9 inversion.

Figure 13:
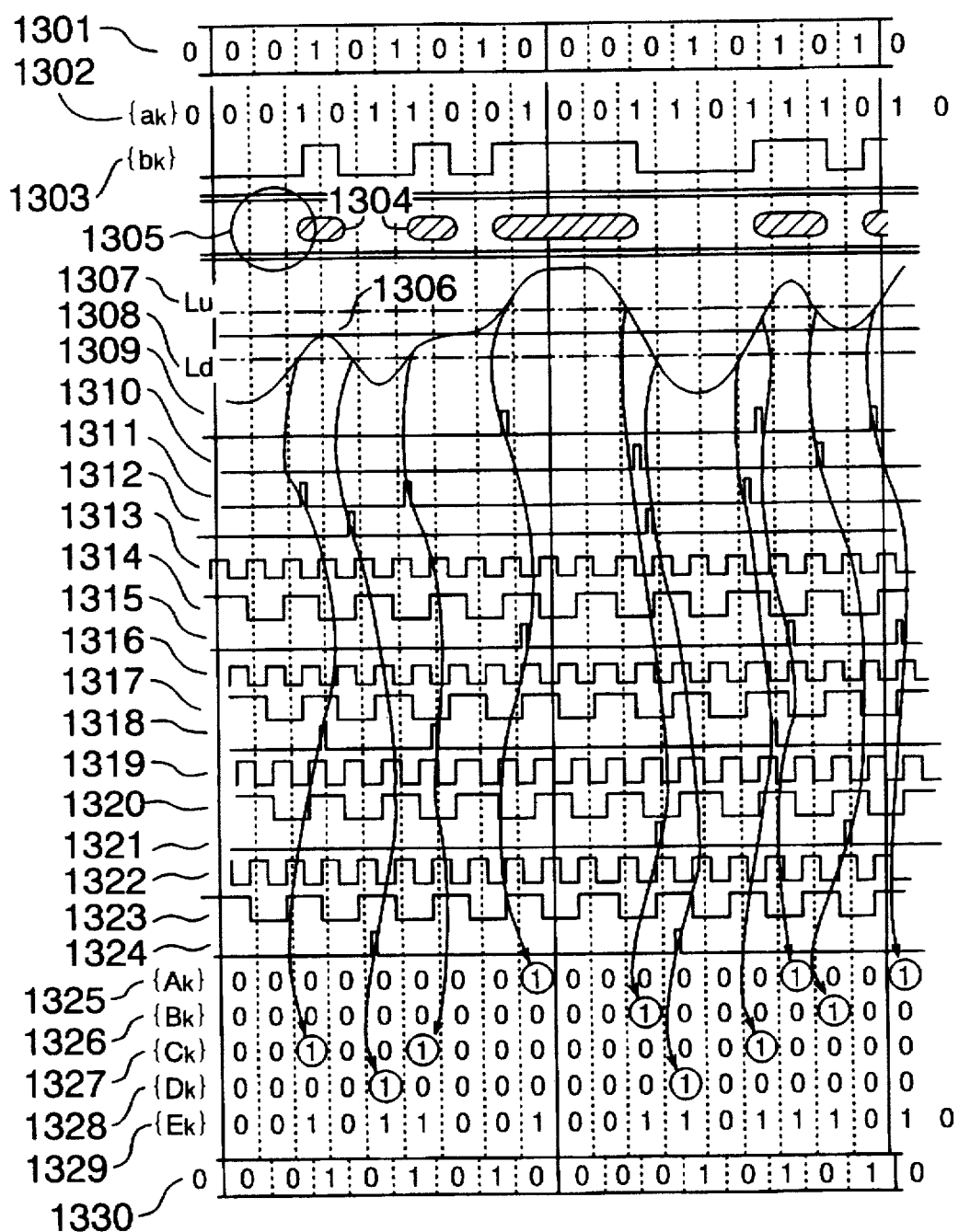
FIG. 13 is a diagram showing waveforms for explaining the flow of process for a reproduction signal processing system according to a second embodiment.

Now, explanation will be made about PR(1,2,1) as applied to an opto-magnetic disk with reference to FIG. 13. As in the case of PR(1,1), the 8/9 block modulation scheme is taken as an example. First, the data bit stream 1031 to be recorded is divided into 8-bit blocks, which in turn are converted into a 9-bit channel bit stream {ak} 1302 (where k is a time variable with the channel bit interval T as a unit, and ak a binary variable assuming either "0" or "1"). FIG. 13, as in FIG. 10, shows a 2-byte data bit stream 0010101000010101. When applying PR(1,2,1), two preceding processes are carried out for the channel bit stream {ak}. More specifically, assuming that the intermediate stream after preceding process is expressed as {bk}, the relation is obtained that bk=ak+bk−2 (where+indicates the exclusive OR or modulo-2 addition). This preceding process is equivalent to carrying out two NRZI modulations for inverting the polarity of the channel bit stream {ak} at the position of bit "1". FIG. 13 shows the latter case. The 8/9 conversion table may be the one corrected in such a manner as to attain the channel bit stream in the conversion table shown in FIG. 12 after one precoding process (A specific table is not described). Explanation will be made more specifically with reference to FIG. 13. The channel data series of 001011001 is made matched with the data bit stream of 00101010 (42 in decimal notation). It is easily understood that one precoding process can surely produce a channel bit stream 001101110 corresponding to 42 in FIG. 12. The intermediate series {bk} obtained by carrying out two procoding processes on the channel data series of 001011001 is used as a main recording pulse train 1303 thereby to form recording marks 1304. Upon reproduction of a recording mark 1304 formed by a reproduction light spot 1305, a reproduction signal waveform 1306 is produced. The reproduction signal waveform 1306 is the one after compensation of the optical response characteristic into the PR(1,2,1) characteristic by means of an equalizer. An upper front edge pulse 1309 is produced at the intersection between the upper slice level 1307 and the rise point of the reproduction signal waveform 1306, and an upper rear edge pulse 1310 is produced at the intersection between the upper slice level 1307 and the fall point of the reproduction signal waveform 1306. In similar fashion, a lower front edge pulse 1311 is obtained at the intersection between the lower slice level 1308 and the rise point of the reproduction signal waveform 1306, and a lower rear edge pulse 1312 at the intersection between the lower slice level 1308 and the fall point of the reproduction signal waveform 1306. According to this embodiment, unlike in the embodiment shown in FIG. 10, the slice levels of the upper and lower front edge pulses and the upper and lower rear edge pulses are assumed to have been set with the relative pulse intervals thereof different from the channel bit interval. The PLL circuit, therefore, is provided for each of the front and rear edge pulses. An upper front edge detection window 1314 is opened from the upper front edge PLL clock 1313, and a lower front edge detection window 1317 from the lower front edge PLL clock 1316. The front edge pulses existing in each window are detected as an upper front edge detection pulse 1315 and a lower front edge detection pulse 1318 respectively. Once a detection pulse is discriminated as bit "1" and the other pulses as bit "0" in this fashion, the upper front edge detection data series {Ak} 1325 and the lower front edge detection data series {Ck} 1326 are obtained. In similar manner, an upper rear edge detection window 1320 is opened from the upper rear edge PLL clock 1319, and a lower rear edge detection window 1323 from the lower rear edge PLL clock 1322. The rear edge pulses present in each window are then detected as an upper rear edge detection pulse 1321 and a lower rear edge detection pulse 1324. When a detection pulse is discriminated as bit "1" and the other pulses as bit "0" in this manner, an upper rear edge detection data series {Bk} 1326 and a lower rear edge detection data series {Dk} 1328 are obtained. A reproduction channel bit stream {Ek} 1329 is obtained by carrying out the calculation of Ek=Ak+Bk+Ck+Dk (where+ indicates the exclusive OR or modulo-2 addition). A reproduction channel bit stream {Ek} is demodulated into a reproduction bit stream 1330 by the 8/9 inversion.

Figure 14:
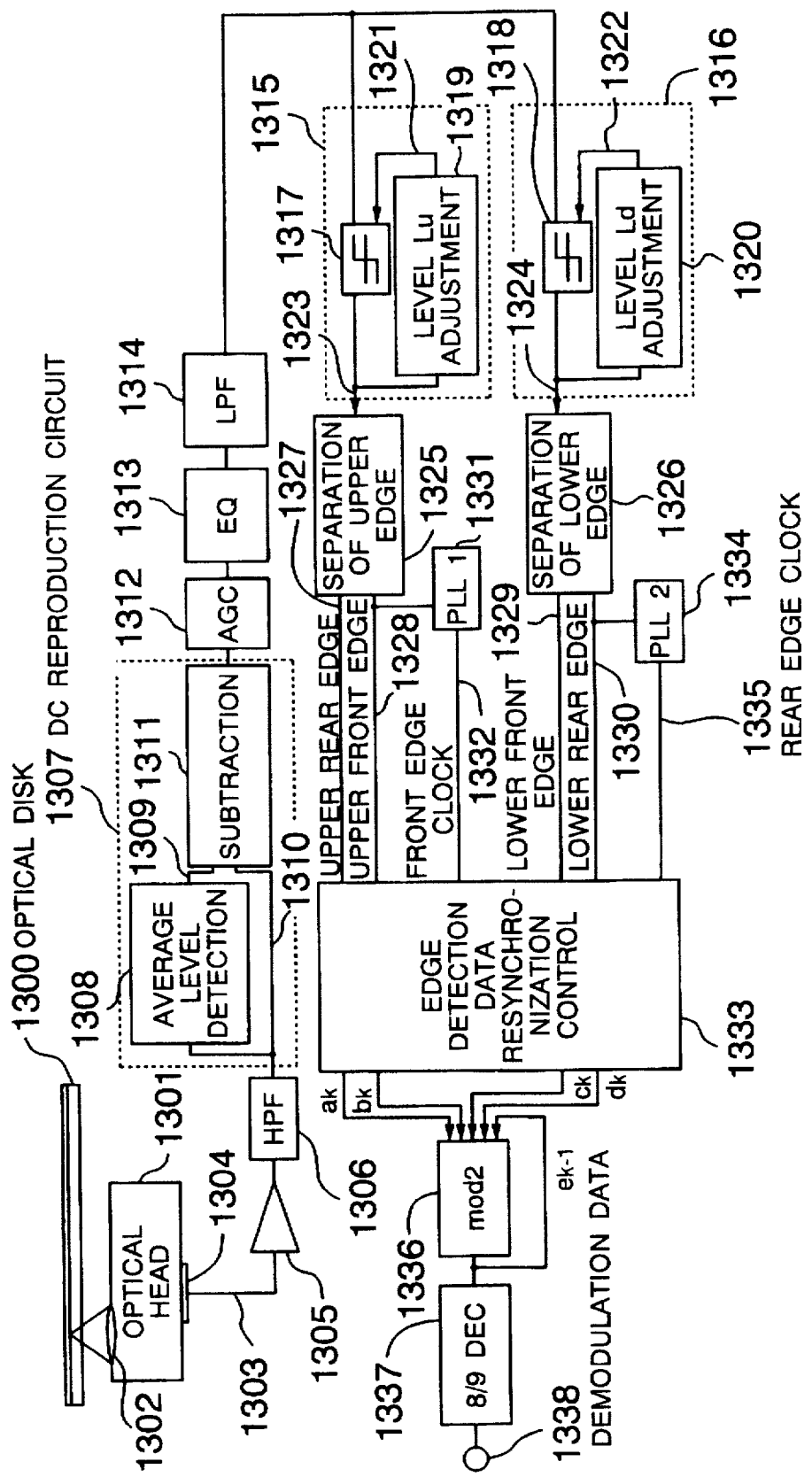
FIG. 14 is a block diagram showing the reproduction process according to a first embodiment.

Now, a specific process for reproduction will be explained in detail for the case of a disk apparatus using an opto-magnetic disk medium with reference to FIG. 14. This embodiment is concerned with the case in which an optical disk 1400 having a diameter of 90 mm (3.5 inches) is driven at a high speed of 3600 revolutions per minute. In the process, the relative speed between the optical head and the disk surface is about 9 m per second for the radius of 24 mm (on the innermost periphery) and about 15 mm per second for the radius of 40 mm (on the outermost periphery). The ZCAV (Zoned Constant Angular Velocity) scheme with the area from the inner periphery to the outer periphery of the disk divided into a plurality of zones is employed to realize a substantially constant surface density for the inner and outer peripheries. Assuming a user data transfer rate of 2.6 MB per second for the inner periphery and 4.4 MB per second for the outer periphery, the recording/reproduction clock frequency of the channel bit after 8/9 modulation is 26 MHz for the inner periphery and 43 MHz for the outermost periphery. In such a case, the shortest mark length written on the opto-magnetic disk is 0.35 µm and the longest mark length 2.45 µm. With the above-mentioned linear speed, the shortest mark recorded using a TbFeCo opto-magnetic recording medium will be substantially circular in shape, so that in an application of the same recording control scheme, the width can be controlled substantially at 0.35 µm up to the longest recording mark. Assuming that the diameter of the reproduction light spot is about 1.2 µm, the effect is small of the reproduction crosstalks from the recording marks on adjacent tracks even when the track pitch is reduced to about 1 µm. In this case, the surface recording density is about 1.6 gigabits per square inch including the 8/9 modulation, and therefore the storage capacity of 600 MB comparable to CD-ROM can be realized by selecting the ZCAV format.

According to this invention, the optical head 1401 has mounted thereon a semiconductor laser (not shown) having a wavelength of about 680 nm and an object lens 1402 having NA=0.55. The diameter of the reproduction light spot is 1.24 µm, and the shortest mark string with the shortest gap cannot be optically resolved. Also, the spectrum of isolated marks is similar to the characteristic of PR(1,1). The optomagnetic reproduction signal 1403 is produced in such a manner that the light reflected from the disk surface is split into a P polarized light and an S polarized light by a wavelength plate (not shown) arranged in front of an optical detector (split into two) 1404 mounted on the optical head 1401, and after photoelectric conversion at the optical detector (split into two) 1404, the output signal thereof is differentially amplified. The opto-magnetic reproduction signal 1403 is amplified at a preamplifier 1405 and applied to a reproduction processing system.

Figure 17:
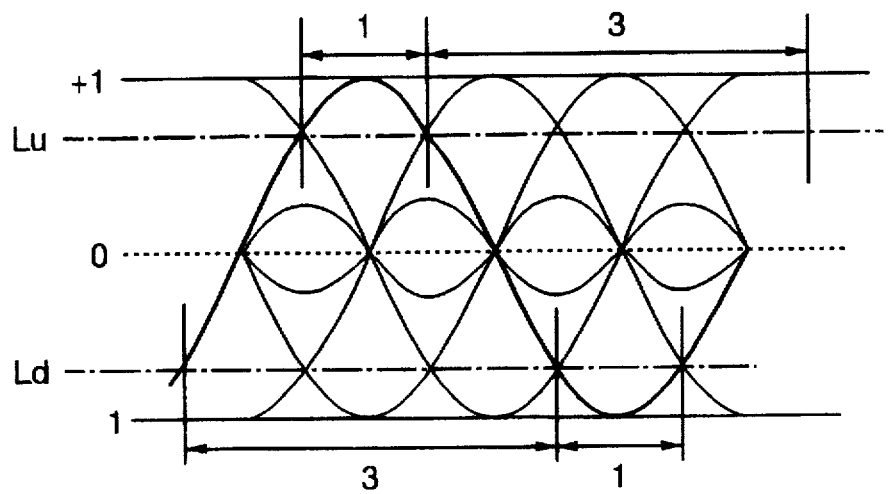
FIG. 17 is a schematic diagram showing a PR(1,1) reproduction waveform and a slice level setting.

The reproduction signal from the preamplifier 1405 is applied through a high-pass filter (HPF) 1406 in order to remove the unrequited low-frequency components superposed on the data signal due to the retardation of the disk substrate or the like. The recording tracks are divided into a plurality of sectors according to a predetermined format. Data are not always recorded over the whole circumference of each track. As a result, the reproduction signal after being passed through the HPF 1406 has the average level thereof subjected to variations (sag) at the boundary between an area storing data and an area not storing data. A DC reproduction circuit 1407 includes an average level signal detector 1408 for detecting the average level 1409 of the reproduction signal and a subtractor 1411 for subtracting the average level 1409 from the original signal 1410 thereby to remove the sag. In the case where there is an unrecorded area before or after a data reproduction sector, pseudo data free of DC components may be embedded. This makes sag removal by the DC reproduction circuit 1407 more effective. The reproduction signal that has been reproduced in DC fashion is applied to an automatic gain control circuit (AGC) 1412 for suppressing the variations of signal amplitude due to the reproduction variations attributable to the recording irregularities or out-of-focus condition. The resulting signal is supplied to a waveform equalizing circuit (EQ) 1413. The EQ 1413 is required as a means of equalization to the PR(1,1) characteristic assuming-the tertiary levels of "–1", "0" and "+1" at the identification points. This embodiment employs a transversal filter including a tapped delay line (not shown). The delay line sets a delay time which is equal to the channel bit interval Tw or substantially an integral division thereof. Such a delay time is set at least for each reproduction zone. The number of taps is desirably at least five for the equalization error to be effectively reduced. Further, the taps of the apparatus should desirably have such a function that the coefficient value of the delay line is optimized at least for each disk taking into consideration the signal deterioration due to the aberration or an out-of-focus condition of the reproduction light spot. For this purpose, in the case of a new disk reproduction, a recording mark string for learning is formed in a specific area on the disk to set an optimum tap coefficient for each head disk. A host control circuit (not shown) sends a control signal 1450 to the EQ 1413 to execute the optimization operation of the EQ characteristics and to hold the same characteristics after the optimization operation. The recording marks for learning may be either opto-magnetic ones or prepits. According to the embodiment, the type of recording marks is not limited to a specific one. The method for detecting the reproduction signal from the opto-magnetic mark is generally different from that for detecting the reproduction signal from prepits. The channel characteristic of the reproduction signal from the prepits, therefore, desirably coincides with or is approximate to that of the reproduction signal from the opto-magnetic marks. An example pattern for learning is shown in FIG. 16. This pattern includes 14 codes with three-valued signal levels appearing at equal probability during each period with the CDS value of zero. The "0" run is 6 in maximum, and the "1" run 4 in maximum. The length of each period is 72 user bytes, and there is only a small overhead against the effective area for recording and reproduction on the disk. The learning pattern, when configured of prepits, for example, is incorporated in a part of each sector of the trial write area of each zone, and is executed in parallel at the time of trial write operation. In this way, the time loss which otherwise might be caused by the trial write operation poses no problem. In the case where the learning pattern is configured of opto-magnetic marks, on the other hand, a sector not concerned with the trial write operation is set in advance and executed in parallel for reproduction at the time of trial write operation. Also, in case of an erroneous erasure, the recording mark may be rewritten under optimal conditions by trial write operation. In view of this, a learning pattern is desirably written in ROM or the like in advance. The learning pattern may be used as an evaluation pattern for self-diagnosis or the like between head and disk at the time of recording/reproduction by the 8/9 modulation+ PR(1,1) on an opto-magnetic disk or the like. The delay time and the tap coefficient value for each reproduction zone can both be set or modified with a digital value by a D/A converter (not shown) or the like. The values thus set are notified from a host control circuit (not shown) by a control signal 1451. The reproduction signal that has passed through the EQ 1413 is applied through a low-pass filter (LPF) 1414 where noises of the high-frequency component not required for signal reproduction are removed and the resulting signal is applied to two slicers 1415, 1416. The cut-off frequency of the LPF 1414 is selected theoretically at a frequency associated with the zero point of a characteristic spectrum, and constitutes a frequency f0 determined by the reciprocal of a value twice the shortest mark length Tw. Actually, however, the optimum set value may be displaced before or after f0 considering the cut-off frequency of the LPF 1414 or the S/N ratio limited by the disk or the recording/ reproduction system used. The slicers 1415, 1416 include slice circuits 1417, 1418 and slice level adjusting circuits 1419, 1420. The slice level adjusting circuits detect a normal slice level on a VFO pattern portion (not shown) added to the header of the data area of a sector. For this purpose, the slice level adjusting circuits 1419, 1420 are controlled in operation by a gate signal 1460 opened in the section of the VFO portion. According to the embodiment under consideration, the optical resolution is in a recording density area where the shortest mark cannot be sufficiently resolved, and therefore, a repetitive pattern of a 2Tw (=0.7 μm) mark and a 2Tw gap are used as a VFO pattern. The eye pattern based on the PR(1,1) characteristic shown in FIG. 17 has two eyes, one each at upper and lower sides, corresponding to the tertiary levels. The optimum slice level is desirably set at a center level of each of the two eyes. These levels constitute Lu and Ld associated with the duty factors of 1:3 and 3:1 of the VFO pattern. The upper slice level adjusting circuit 1417 detects the average DC level by applying through a low-pass filter (not shown) the repetitive pulse binarized at the slice circuit 1417 during the VFO period. The difference between this average DC level and a target level for realizing the slicing by the duty factor of 3:1 is fed back to adjust the slice level 1422. At the end of the VFO period, the slice level adjusting circuits 1419, 1420 hold the set slice levels 1421, 1422, and continue to supply the slicing circuits 1417, 1422 with the same levels in a succeeding data area. The gate signal 1460 is used also for this hold operation. In reproducing the data of the next sector, the above-mentioned operation is repeated sequentially.

The upper slice data signal 1413 and the lower slice data signal 1424 obtained at the slicers 1415, 1416 are applied to an upper edge separation circuit 1425 and a lower edge separation circuit 1426 respectively. The upper edge separation circuit 1425 generates two edge pulse trains 1427, 1428 corresponding to the front and rear edge positions of the upper slice data signal 1423. In similar fashion, the lower edge separation circuit 1426 generates two edge pulse trains 1429, 1430 corresponding to the front and rear edge positions of the lower slice data 1424. The reproduction signal flow for these operations is shown in FIG. 10, which is concerned with the case in which data bit streams of 42 (00101010) and 21 (00010101) in decimal notation are recorded on the optical disk. An upper front edge pulse, an upper rear edge pulse, a lower front edge pulse and a lower rear edge pulse are generated as shown in correspondence with the intersection between the slice levels Lu and Ld and the reproduction signal waveform.

Among the four types of edge pulses described above, the upper front edge pulse 1428 is supplied to a PLL1 circuit 1431, which in turn outputs a front edge clock 1432 synchronous with the upper front edge pulse train 1428. The upper front edge pulse train 1428 and the lower front edge pulse train 1429 both correspond to the front edge of the same recording mark string. The front edge clock 1432 is in synchronism also with the lower edge pulse train 1429. An edge detection data resynchronization control circuit 1433, as shown in the flowchart of FIG. 10, opens the front edge detection window from the front edge PLL clock (not shown in FIG. 14) and thereby discriminates the positions of the upper front edge pulse and the lower front edge pulse. In similar manner, the lower rear edge pulse train 1430 is supplied to a PLL2 circuit 1434, which in turn outputs a rear edge clock 1435 in synchronism with the lower rear edge pulse train 1430. This is also the case with the upper rear edge pulse train 1427 and the lower rear edge pulse train 1430, which correspond to the rear edge of the same recording mark string. The rear edge clock 1435, therefore, is synchronous also with the upper rear edge pulse train 1427. The edge detection data resynchronization control circuit 1433, as shown in the flowchart of FIG. 10, opens the rear edge detection window from the rear edge PLL clock (not shown in FIG. 14), and thereby discriminates the positions of the upper rear edge pulse and the lower rear edge pulse. These processes of operation produce, as shown in the flowchart of FIG. 10, an upper front edge detection data string {Ak}, an upper rear edge detection data string {Bk}, a lower front edge detection data string {Ck} and a lower rear edge detection data string {Dk}. The out-of-timing conditions of these data are absorbed by the edge detection data resynchronization control circuit 1433, thereby reducing the effect of the displaced slice setting caused by the length variations of the recording marks or the level variations of the reproduction signal. The details of the resynchronization control operation are described in JP-A-2-183471 and therefore will not be explained herein. A channel bit stream {Ek} can be resynthesized from each edge detection data string of {Ak}, {Bk}, {Ck} and {Dk} by taking the exclusive OR of each of Ak, Bk, Ck and Dc with the channel bit Ek-1 for the preceding time by means of a modulo-2 circuit 1436. The channel bit stream {Ek} thus resynthesized is converted into 9-bit blocks by an 8/9 inverter 1437 and then demodulated into the original data bit stream {Ek} (See FIG. 10).

According to this embodiment, taking advantage of the synchronization between the upper front edge pulse and the lower front edge pulse and also between the upper rear edge pulse and the lower rear edge pulse, two PLL circuits are used. In the case where the edge position of the reproduction signal waveform undergoes a change with the slice level, however, the use of two PLL circuits each for upper and lower sides of course leads to a higher effect of suppressing variation factors including the variations under consideration and at the same time improves the reliability of data discrimination. Another embodiment taking this point into consideration is described below.

Figure 15:
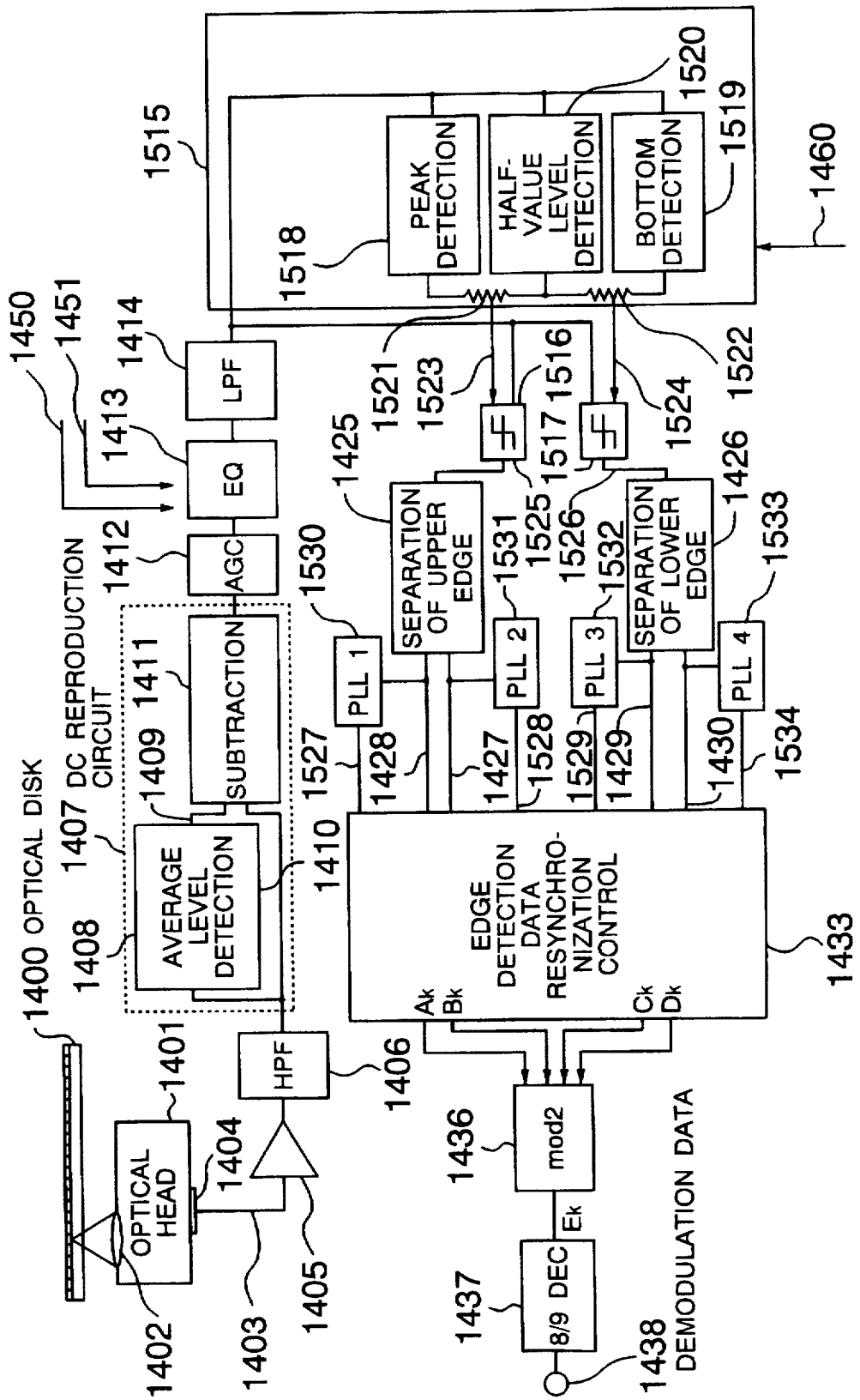
FIG. 15 is a block diagram showing the reproduction process according to a second embodiment.
Figure 18:
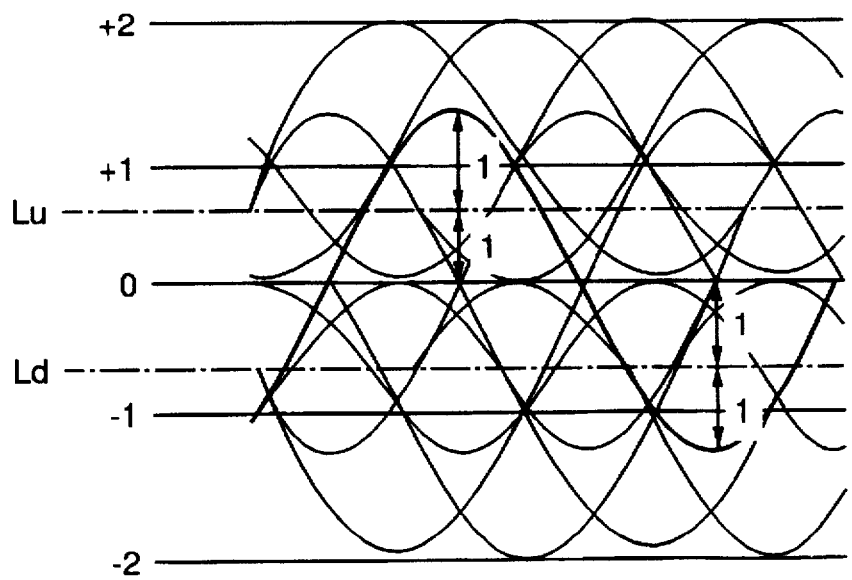
FIG. 18 is a schematic diagram showing a PR(1,2,1) reproduction waveform and a slice level setting.

FIG. 15 is a block diagram showing another configuration example for reproduction operation according to the present invention. This reproduction processing system assumes the case in which PR(1,μ,1)(2 ≦μ≦3) characteristic is applied. The PR(1,μ,1)(2≦μ≦3) characteristic, as compared with the PR(1,1) characteristic, has a response concentrated in a low-frequency region and is advantageous in terms of S/N ratio in view of the fact that the noise emphasis in high-frequency region by the equalizer is smaller. The operation before the slice circuit in FIG. 15 is similar to the corresponding operation in the reproduction processing block diagram of FIG. 14 and therefore will not be described again. The reproduction signal that has passed through the EQ 1313 is applied through a low-pass filter (LPF) 1314 where noises of the high-frequency components unrequired for signal reproduction are removed. The resulting signal is applied to a slice level setting circuit 1515 and slicing circuits 1516, 1517. The slice level setting circuit 1515 includes a peak detector 1518, a bottom detector 1519, a half-value level detector 1520 and a dividing resistors 1521, 1522. As shown in FIG. 18, the PR(1,2,1) characteristic is involved when=2. At this time, the eye pattern assumes five-valued levels of "+2", "+1", "0", "−1" and "−2". In the case where a level near to "−1" or "+1" is selected out of these five levels, the edge pulse data explained with reference to FIG. 13 can be detected. The embodiment under consideration employes two levels Lu and Ld which splits the upper amplitude height and the lower amplitude height of the VFO pattern (the repetitive pattern of 2Tw length mark/gap) to the ratio of about 1:1. The peak detector 1518 detects and outputs the peak level of signal amplitude for the VFO pattern (not shown) added to the header of the data area of each sector. Similarly, the bottom detector 1519 detects and outputs the bottom level of signal amplitude for the VFO pattern. The half-valued level detector 1520 detects and outputs the level at which to slice the VFO pattern to a half value. The two levels output from the peak detector 1518 and the half-valued level detector 1520 are divided by the approximate ratio of 1 :1 by a dividing resistor 1521, and the resulting signal constitutes an upper slice level Lu 1523. In similar fashion, the two levels output from the bottom detector 1519 and the half-valued level detector 1520 are split in the ratio of about 1:1 by the dividing resistor 1522, and the resulting signal constitutes a lower slice level Ld 1524. The operation for setting the slice level described above is accomplished by the VFO pattern section (not shown) added to the header of the data area of the sector involved. For this purpose, the operation of the slice level setting circuit 1515 is controlled by the gate signal 1460 adapted to open in the section of the VFO1 portion. At the end of the VFO1 period, the slice level setting circuit 1515 holds the set slice levels 1523, 1524, and continues to supply the slice circuits 1516, 1517 with the same level in the succeeding data area. This hold operation also uses the gate signal 1460. In reproducing the data of the next sector, the above-mentioned operation is repeated. When μ becomes larger than 2, the level of the three values "+2", "0" and "−2" out of the five values of "+2", "+1", "0", "−1" and "−2" are dispersed instead of being concentrated at a point, while the levels of "−1" and "+1" are fixed. As a result, the data reproduction according to the invention is not specifically limited to μ=2. An optimum value of μ is determined in accordance with the characteristics of the equalizer and the recording mark and the reproduction light spot. In the case where a minimum mark of 0.35 μm is formed using the recording control method according to the invention, μ assumes the value of 2.26, when the number of taps of the waveform equalizing circuit of transversal type is set to five, for example.

An upper slice data signal 1525 and a lower slice data signal 1526 obtained at slicing circuits 1516 and 1517 are applied to the upper edge separation circuit 1425 and the lower edge separation circuit 1426 respectively. The upper edge separation circuit 1425 generates two types of edge pulse trains 1427 and 1428 in accordance with the front and rear edge positions of the upper slice data signal 1423. In similar fashion, the lower edge separation circuit 1426 generates two types of edge pulse trains 1429 and 1430 in accordance with the front and rear edge positions of the lower slice data 1424. Among these four types of edge pulses, the upper front edge pulse 1428 is applied to a PLL1 circuit 1530, which in turn outputs an upper front edge clock 1527 in synchronism with the upper front edge pulse train 1428. Also, the upper rear edge pulse 1427 is applied to a PLL2 circuit 1531, which in turn outputs an upper rear edge clock 1528 in synchronism with the upper rear edge pulse train 1427. In similar manner, the lower front edge pulse train 1429 is applied to a PLL3 circuit 1532, which in tuns outputs a lower front edge clock 1529 in synchronism with the lower front edge pulse train 1429. Also, the lower rear edge pulse train 1430 is supplied to a PLL4 circuit 1533, which in turn outputs a lower rear edge clock 1534 in synchronism with the lower rear edge pulse train 1430. These detection edge pulse trains and the edge clocks are applied to an edge detection/data resynchronization control circuit 1433, and as shown in the flowchart of FIG. 11, outputs an upper front edge detection data string {Ak}, an upper rear edge detection data string {Bk}, a lower front edge detection data string {Ck} and a lower rear edge detection data string {Dk}. The operation of the resynchronization control circuit which is described in detail in JP-A-2-183471 will not be explained any further. A channel bit stream {Ek} can be resynthesized from each edge detection data string of {Ak}, {Bk}, {Ck} and {Dk} by exclusive-ORing the channel bit Ek-1 at the preceding time with each of Ak, Bk, Ck and Dk by means of the modulo-2 circuit 1436. The channel bit stream {Ek} thus resynthesized is converted into 9-bit blocks by the 8/9 inverter 1436, and then demodulated into the original data bit stream 1438 (See FIG. 11).

The method of processing the reproduction signal described above is applicable not only to an optical disk for recording information with an opto-magnetic mark as described with reference to the embodiments above but also to an optical disk of RAM or ROM type composed of other recording media.

Figure 19:
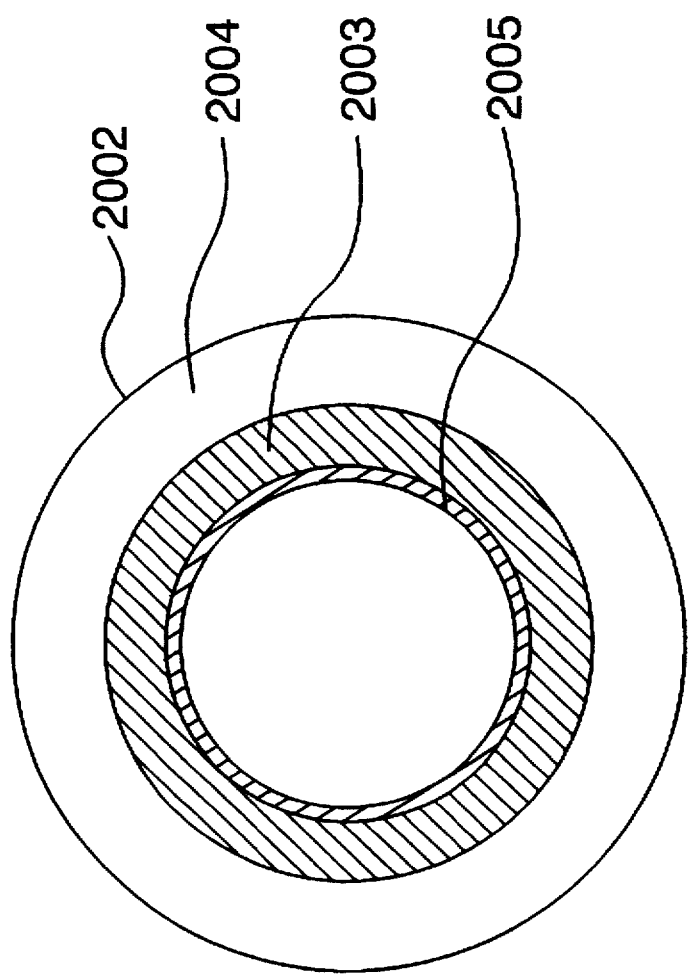
FIG. 19 is a schematic diagram showing a data area of an optical disk having the partial ROM function.
Figure 20:
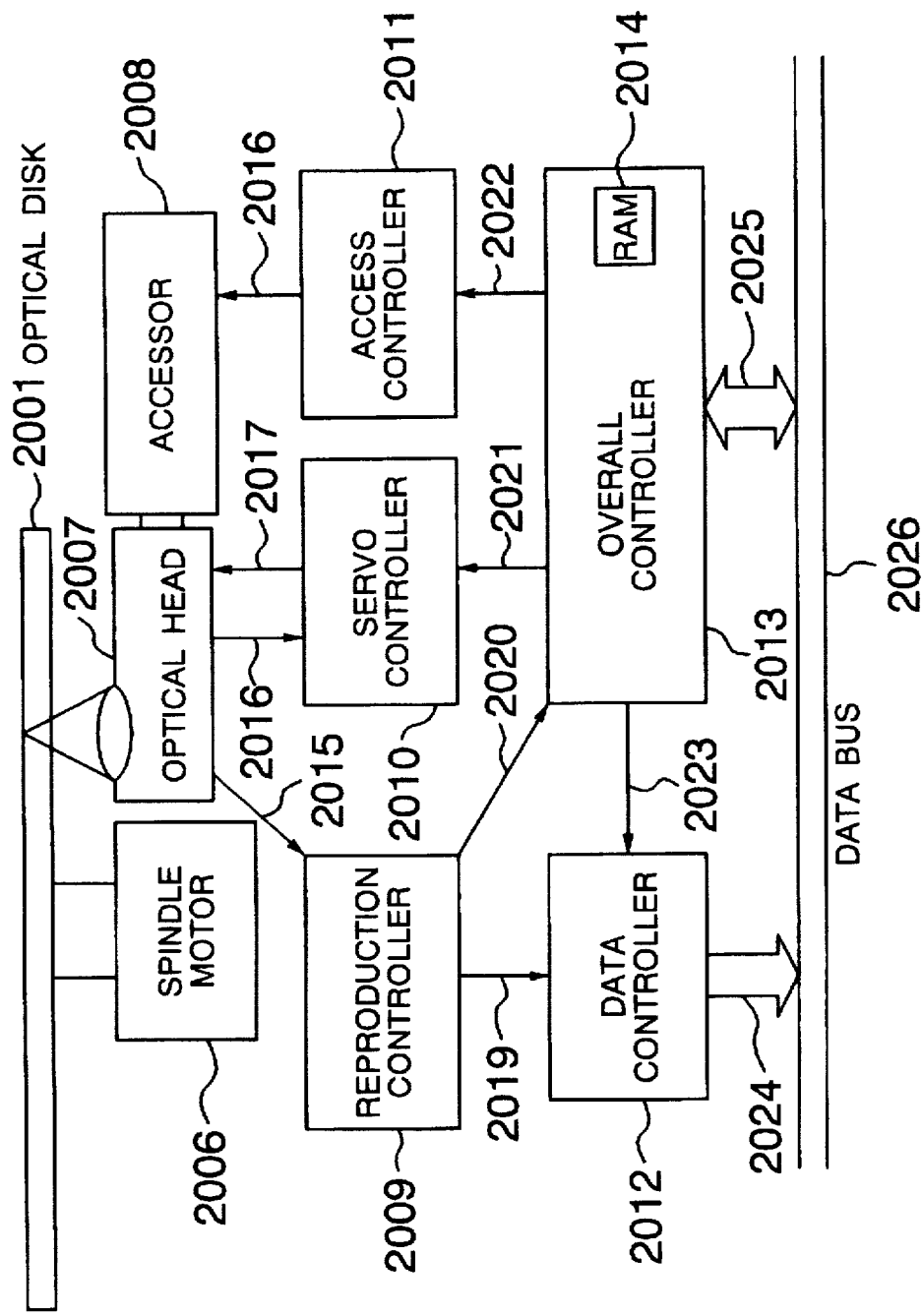
FIG. 20 is a block diagram showing the configuration of an optical disk apparatus meeting the requirements of a partial ROM.
Figure 21:
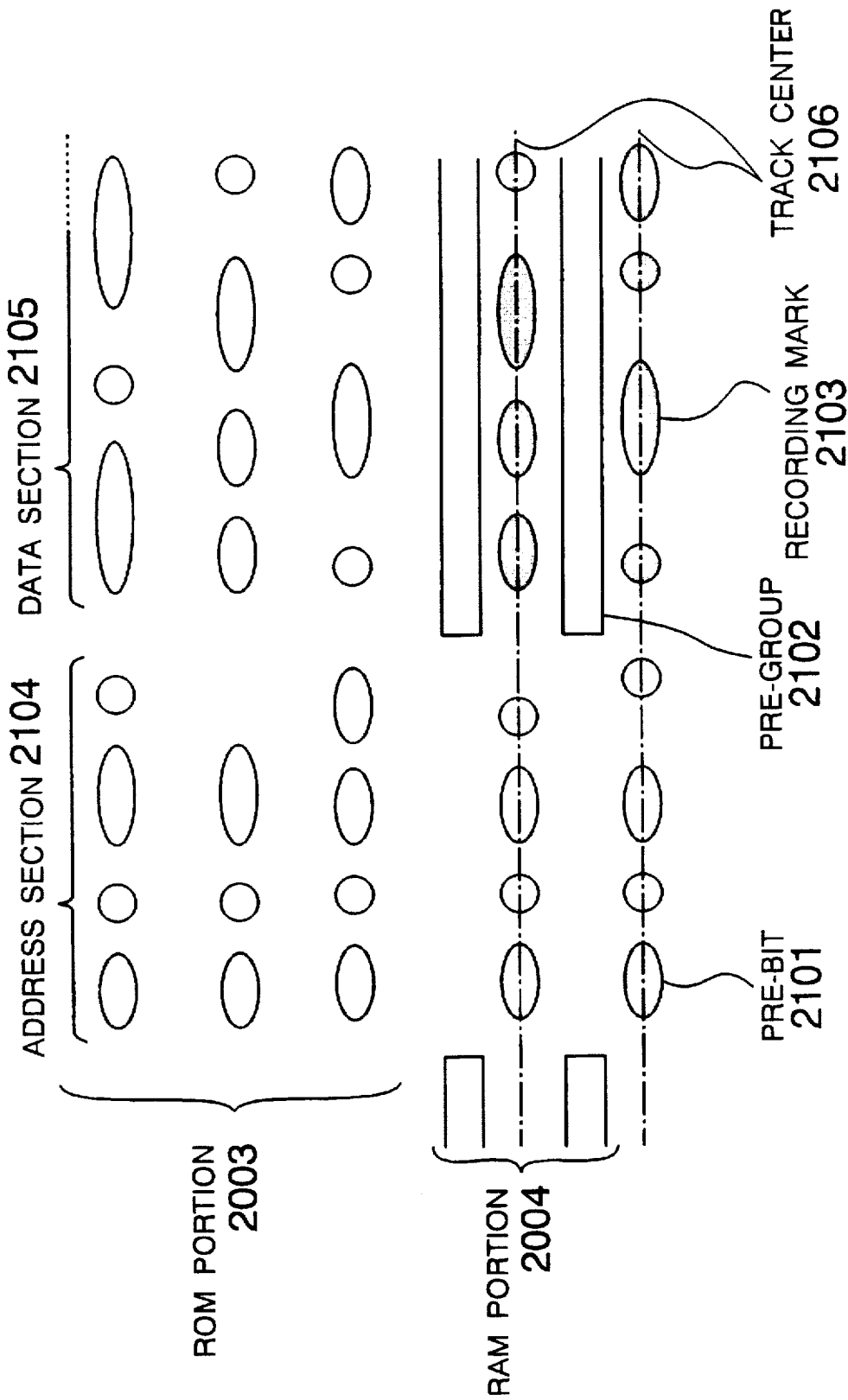
FIG. 21 is a plan view showing the surface structure of a partial ROM.
Figure 22:
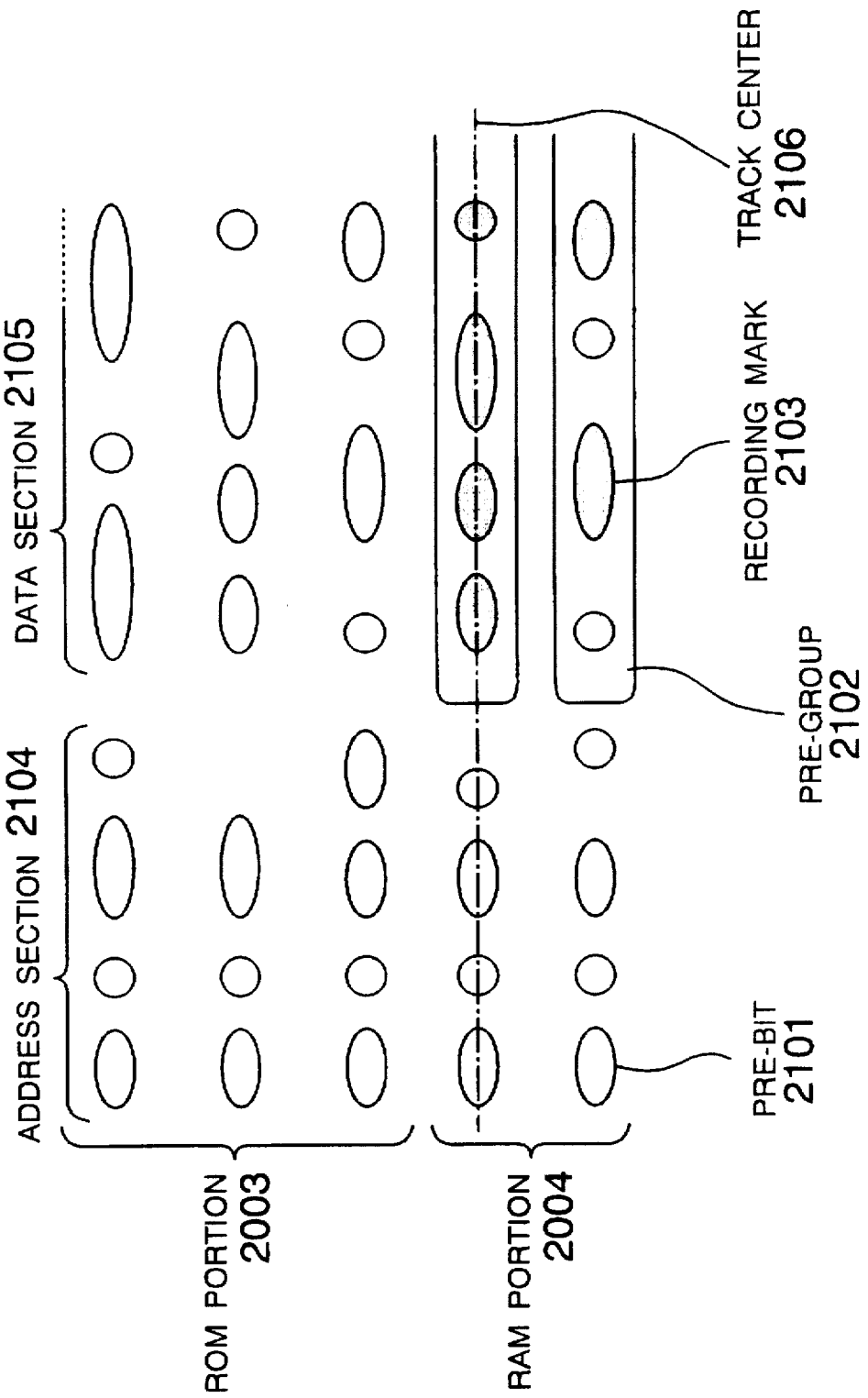
FIG. 22 is a plan view showing the surface structure of a partial ROM.

Now, explanation will be made about a method of reproducing information from a partial ROM (P-ROM) including a ROM portion having information recorded before shipment from the factory and a RAM portion recordable by the user. FIG. 19 is a diagram showing a data area of an optical disk having the partial ROM function. FIG. 20 is a diagram showing the configuration of an optical disk apparatus meeting the requirements of partial ROM. FIGS. 21 and 22 are diagrams showing the surface structure of a partial ROM.

First, the structure of a partial ROM 2002 adapted to be read by the initial operation of an optical disk will be explained. An example of the surface topology of the partial ROM 2002 is shown in FIG. 21. The ROM portion 2003 is entirely composed of pre-pits 2101. The data section 2105 of the RAM portion 2004 includes tracking servo pre-groups 2102 each arranged between track centers 2106, and the address section 2104 of the RAM portion 2004 includes pre-pits 2101 like the ROM portion 2003. The address section 2104 of the RAM portion 2004-lacks the pre-groups 2102. Taking note of a given pre-group 2102, the distance in radial direction of the disk between the center of a recess or a protrusion closest to the pre-group 2102 and the center of the same pre-group 2102 can assume a size at least about equal to the track pitch. The same can be said of rows of the pre-pit 2102, so that the center distance of recesses or protrusions in radial direction of the disk can be of a length at least about equal to the track pitch at each point. The recording marks 2103 are recorded only in the data section 2105 between the pre-groups 2102. The pre-pits 2101 and the pre-groups 2102 are all constructed of recesses or protrusions having a predetermined height with a wavelength of one eighth to one sixth. The constant height facilitates the mastering. For lack of portions concentrated with the pre-groups 2102 and the pre-pits 2101, the disk can be duplicated easily for an improved yield. The difference in tracking servo signal characteristics (including the polarity) between the ROM portion 2003 and the RAM portion 2004 makes it necessary to store the servo signal characteristic information in a disk information storage 2005 in advance.

Another example of surface topology of the partial ROM 2002 is shown in FIG. 22. The ROM portion 2003 is all made of the pre-pits 2102. The data section 2105 of the RAM portion 2004 includes wide tracking servo pre-groups 2102 fabricated on the track center 2106. The address section 2104 of the RAM portion 2004, like the ROM portion 2003, includes the pre-pits 2101. The address section 2104 of the RAM portion 2004, however, has no pre-groups 2102 fabricated thereon. The recording marks 2103 are recorded only in the data section 2105 above the pre-groups 2102. The pre-pits 2101 and the pre-groups 2102 are all composed of recesses and protrusions having a predetermined height with a wavelength of one eighth to one sixth. The constant height facilitates the mastering, and the disk can be easily duplicated for lack of any portion concentrated with the pre-groups 2102 and the pre-pits 2101. The ROM portion 2003 and the RAM portion 2004 have different tracking servo signal characteristics, and therefore, the servo signal characteristic information is required to be stored in the disk information storage 2005 in advance. Also, the polarity of the tracking servo signal using the diffracted light can be the same for the ROM portion 2003 and the RAM portion 2004.

A data structure of the partial ROM 2002 will be explained. The conventional data recording disk medium has a sector structure with several hundreds of bytes as a unit. The sector has recorded therein error correction information interleaved with user information for correcting errors by sector. With regard to the RAM portion 2004, an error that cannot be corrected is accommodated by the use of an alternative sector. The ROM portion 2003, on the other hand, employs no concept of accommodating an error sector with an alternative sector. In the ROM portion 2003 of the partial ROM 2002, therefore, an information block is formed for each of a plurality of sectors, and a burst error generation is suppressed by performing the interleaving operation over a plurality of sectors. This leads to a low cost and a high yield comparable to those of the CD-ROM conventionally available on the market. Since the data structure is different for different parts of the optical disk 2001, the data controller 2012 is required to recognize whether a signal under reproduction, if any, is derived from the ROM portion 2003 or from the RAM portion 2004.

Now, the overall reproduction operation of the partial ROM 2002 will be described. First, reference is had to the initial operation of an optical disk apparatus. An optical disk 2001 is mounted on a spindle motor and rotated at a constant speed. An accessor 2008 sets an optical head 2007 in position on a disk information storage 2005. Information as to whether the optical disk 2001 is a partial ROM 2002 or not, information on the areas and servo signal characteristics of the ROM portion 2003 and information on the areas and servo signal characteristics of the RAM portion are recorded in the disk information storage 2005 beforehand in the form of an uneven structure of recesses and protrusions. Prior to the recording/reproduction operation, the information read from the disk storage 2005 by the optical head 2007 is stored in a RAM 2014 of an overall controller 2013 through a reproduction controller 2009.

Now, the access operation will be explained. The overall controller 2013 transmits an object address 2022 to an access controller 2011 in accordance with a command 2025 sent from a data bus 2026. Further, the overall controller 2013 compares the object address 2022 with the information in the RAM 2014, and sends a control signal 2021 corresponding to the ROM portion 2003 or the RAM portion 2004 separately to the servo controller 2010.

The access controller 2011 sends a control signal 2018 to the accessor 2008, and sets the optical head 2007 in position in the vicinity of the object address 2022. The servo controller 2010 receives a servo error signal 2016 from the optical head 2007 and processes the same signal in accordance with the control signal 2021 thereby to generate a servo drive signal 2017. This servo drive signal 2017 is used to position the optical head 2007 on a track. The reproduction controller 2009 receives a reproduction signal 2015 from the optical head 2007 and sends a present address 2020 to the overall controller 2013. The overall controller 2013 repeats the aforementioned processes of operation until the present address 2020 comes to coincide with the object address 2022, and then completes the access operation.

A method of data reproduction will be explained. The overall controller 2013 sends a control signal 2023 to the data controller 2010 in accordance with whether the area of the present address 2020 is the ROM portion 2003 or the RAM portion 2004. The data controller 2012 de-interleaves, corrects errors or otherwise processes the unprocessed data 2019 sent from the reproduction controller 2009 in a manner corresponding to the control signal 2023, and applies the reproduction data 2024 to the data bus 2026. The structure of the reproduction data 2024 is not different between ROM data and RAM data. Therefore, the overhead of the reproduction circuit can be reduced and a lower cost of the optical disk apparatus can be realized.

The foregoing operation permits a high-density, low-cost reproduction operation of a partial ROM.

We claim:

1. An optical disk apparatus for recording information by forming optical recording marks on a recording medium, comprising:

a semiconductor laser providing a light source;

means for driving said semiconductor laser with a pulse-shaped drive current corresponding to the recording data;

means for superposing a high-frequency current on said drive current;

means for generating a timing signal changeable within a minimum rewriting unit on said recording medium, by referring to the recording data;

means for controlling the amplitude of said high-frequency current by referring to said timing signal; and means for synchronizing said high-frequency current with said drive current.

2. An optical disk apparatus for recording information by forming optical recording marks on a recording medium, comprising:

a semiconductor laser providing a light source;

means for driving said semiconductor laser with a pulse-shaped drive current corresponding to the recording data;

means for controlling the amplitude of said drive current;

focusing means for focusing the laser beam emitted from said semiconductor laser on said recording medium;

servo means for scanning a predetermined recording area on said recording medium by a spot focused by said focusing means;

means for controlling the focus offset of said servo means;

means for recording a predetermined trial write pattern at a predetermined position of said recording medium by changing the amplitude of said drive current and/or the amount of said offset;

means for evaluating the reproduction signal from said trial write pattern; and means for controlling the amplitude of said drive current and/or the amount of said offset on the basis of the result of evaluation obtained from said evaluation means.

3. An optical disk apparatus for recording information by forming optical recording marks on a recording medium, comprising:

a semiconductor laser;

means for driving said semiconductor laser with a pulse-shaped drive current corresponding to the recording data;

means for controlling the amplitude of said drive current;

focusing means for focusing the laser beam emitted from said semiconductor laser on said recording medium;

servo means for scanning a predetermined recording area on said recording medium by a focusing spot obtained by said focusing means;

means for controlling the amount of tracking offset of said scanning means;

means for recording a predetermined trial write pattern at a predetermined position of said recording medium by changing the amplitude of said drive current;

means for evaluating the reproduction signal from said trial write pattern; and means for controlling the amplitude of said drive current and/or the amount of said offset on the basis of the result of evaluation obtained from said evaluation means.

4. An optical disk apparatus for recording information by forming optical recording marks on a recording medium, comprising:

a semiconductor laser providing a light source;

means for driving said semiconductor laser with a pulse-shaped drive current corresponding to the recording data;

means for controlling the amplitude of said drive current;

focusing means for focusing the laser beam emitted from said semiconductor laser on said recording medium;

servo means for scanning a predetermined recording area on said recording medium by a spot focused by said focusing means;

means for recording a predetermined trial write pattern at a predetermined position of said recording medium by changing the amplitude of said drive current;

means for evaluating the reproduction signal from said trial write pattern; and means for controlling the amplitude of said drive current on the basis of the result of evaluation obtained from said evaluation means;

wherein the waveform of said pulse-shaped current includes at least a portion formed with a recording mark, a resting portion close to said recording mark-forming portion, and a preheating portion having a light emission power level between said recording mark-forming portion and said resting portion, the current waveform of said recording mark-forming portion includes at least a first substantially rectangular pulse current waveform and a second substantially rectangular periodic pulse current waveform succeeding to said first substantially rectangular pulse current waveform, the first current waveform and the second current waveform have different current amplitudes from each other, the period of the second current waveform corresponds to the amount of change of the length of said recording mark, the duty factor of said second current waveform is approximately 50%, the period of said resting portion corresponds to substantially one half of the amount of change of the length of said recording mark, said drive current for said trial write operation is a pulse-shaped current for selected one of said mark-forming portion and said preheating portion, the trail write operation is carried out in the trail write area on said optical disk by changing at least selected one of the first current amplitude and the second current amplitude in stages, and said current amplitude most suitable is selected corresponding to all the areas on said optical disk.

5. An optical disk apparatus for recording information by forming optical recording marks in such a manner that the leading edge and the trailing edge of said optical recording marks are positioned in a predetermined sequential relation in accordance with the recording data encoded by a predetermined modulation scheme, comprising:

a semiconductor laser;

means for driving said semiconductor laser with a pulse-shaped drive current corresponding to the recording data;

means for controlling the amplitude of said drive current;

focusing means for focusing the laser beam emitted from said semiconductor laser on said recording medium;

servo means for scanning a predetermined recording area on said recording medium by a spot focused by said focusing means;

signal reproduction means having a pass-band up to the DC current for producing a reproduction signal from said recording marks;

means for recording a predetermined trial write pattern at a predetermined position of said recording medium by changing the amplitude of said drive current;

means for evaluating the reproduction signal from said trial write pattern;

means for controlling the amplitude of said drive current on the basis of the result of evaluation obtained from said evaluation means;

means for equalizing the reproduction signal from said recording marks in such a manner as to adapt to selected one of the partial response (1,1) and the channel characteristic of the partial response $(1,\mu,1)(2 \leq \mu \leq 3)$; means for generating a plurality of detection levels from the reproduction signal produced from a predetermined area on said recording medium;

means for detecting the positional information of the leading edge and the trailing edge of the reproduction signal at each of said detection levels independently of each other;

means for storing the detection information;

means for reconstructing the recording code information in such a manner that said detection information holds a normal sequential relation; and means for demodulating the reconstructed recording code information into the recording data according to said modulation scheme.

6. An optical disk apparatus comprising:

means for rotating at a substantially equal angular velocity an optical disk having information "1" recorded thereon in correspondence with the leading edge and the trailing edge of pre-pit data as recording data together with said pre-pit data in such a manner that the leading edge and the trailing edge of said pre-pit data are positioned in a predetermined sequential relation on the data plane, said recording data being obtained by a predetermined preceding operation performed on the channel data encoded according to a predetermined modulation scheme;

signal reproduction means having a pass-band up to the DC current for producing a reproduction signal from said pre-pit data;

means for equalizing said two types of prepit data reproduction signal in such a manner as to adapt to selected one of the partial response (1,1) and the channel characteristic of the partial response $(1,\mu 1)(2 \leq \mu \leq 3)$;

means for generating a plurality of detection levels from said equalized reproduction signals;

means for detecting the positional information of the leading edge and the trailing edge of the reproduction signal at a plurality of said levels independently of each other;

means for storing the detection information;

means for reconstructing the recording code information in such a manner that the detection information is holds a normal sequential relation; and means for demodulating the reconstructed recording code information into the recording data according to said modulation scheme.

7. An optical disk apparatus for recording information by forming optical recording marks on a recording medium in such a manner that the leading edge and the trailing edge of said optical recording marks are positioned in a predetermined sequential relation in accordance with the recording data encoded by a predetermined modulation scheme, comprising:

a semiconductor laser providing a light source;

means for driving said semiconductor laser with a pulse-shaped drive current;

means for controlling the amplitude of said drive current;

focusing means for focusing the laser beam emitted from said semiconductor laser on said recording medium;

signal reproduction means having a pass-band up to the DC current for producing a reproduction signal from said recording marks;

servo means for scanning a predetermined recording area on said recording medium by a spot focused by said focusing means;

means for recording a predetermined trial write pattern at a predetermined position of said recording medium by changing the amplitude of said drive current;

means for evaluating the reproduction signal from said trial write pattern;

means for controlling the amplitude of said drive current on the basis of the result of evaluation obtained from said evaluation means;

means for equalizing the reproduction signal of said recording marks in such a manner as to adapt to selected one of the partial response (1,1) and the channel characteristic of the partial response $(1,\mu,1)$ $(2 \leq \mu \leq 3)$;

means for generating a plurality of detection levels from the reproduction signal produced from a predetermined area on said recording medium;

means for detecting the positional information of the leading edge and the trailing edge of the reproduction signal at a plurality of said detection levels independently of each other;

means for storing said detection information;

means for reconstructing the recording code information in such a manner that the detection information holds a normal sequential relation; and means for demodulating the reconstructed recording code information into the recording data according to said modulation scheme;

wherein the modulated code information is recorded by one preceding process using a block modulation scheme in which the number of continuous bits of only "0" or only "1" in the code information modulated by said modulation scheme is not more than six and the number of continuous bits of only "0" or only "1" in the reproduction data string for each of said detection levels is not more than 19.

8. An optical disk apparatus for recording information by forming optical recording marks on a recording medium in such a manner that the leading edge and the trailing edge of said optical recording marks are positioned in a predetermined sequential relation in accordance with the recording data encoded by a predetermined modulation scheme, comprising:

a semiconductor laser;

means for driving said semiconductor laser with a pulse-shaped drive current corresponding to the recording data;

means for controlling the amplitude of said drive current;

focusing means for focusing the laser beam emitted from said semiconductor laser on said recording medium;

servo means for scanning a predetermined recording area on said recording medium by a spot focused by said focusing means;

signal reproduction means having a pass-band up to the DC current for producing a reproduction signal from said recording marks;

means for recording a predetermined trial write pattern at a predetermined position of said recording medium by changing the amplitude of said drive current;

means for evaluating the reproduction signal from said trial write pattern;

means for controlling the amplitude of said drive current on the basis of the result of evaluation by said reproduction signal evaluation means regarding said trial write pattern;

means for evaluating the reproduction signal from a learning pattern located at a predetermined position on said recording medium;

means for equalizing said reproduction signal on the basis of the result of evaluation by said reproduction signal evaluation means from said learning pattern in such a manner as to adapt to selected one of the partial response (1,1) and the channel characteristic of the partial response $(1,\mu,1)$ $(2 \leq \mu \leq 3)$;

means for generating a plurality of detection levels from the reproduction signal produced from a predetermined area on said recording medium;

means for detecting the positional information of the leading edge and the trailing edge of the reproduction signal at each of said detection levels independently of each other;

means for storing said detection information;

means for reconstructing the recording code information in such a manner that said detection information holds a normal sequential relation; and means for demodulating the reconstructed recording code information into the recording data according to said modulation scheme;

wherein said modulation scheme is a block modulation scheme in which the number of continuous bits of only "0" or only "1" in the modulated code information is not more than six and the number of continuous bits of only "0" or only "1" in the reproduction data string for each of said detection levels is not more than 19, said modulated code information is recorded by being subjected to one precoding process, and said learning pattern for adjusting the equalizing means is such that the modulated block codes include a code with the CDS value of 0 and that the discrimination levels appear uniformly.

* * * * *